United States Patent
Nakamoto et al.

(10) Patent No.: US 9,803,083 B2
(45) Date of Patent: Oct. 31, 2017

(54) REINFORCED THERMOPLASTIC RESIN COMPOSITION AND MOLDING

(71) Applicant: UMG ABS, LTD., Tokyo (JP)

(72) Inventors: Masahito Nakamoto, Ube (JP); Hideichiro Kawaguchi, Ube (JP)

(73) Assignee: UMG ABS, LTD., Tokyo (JP)

( * ) Notice: Subject to any disclaimer, the term of this patent is extended or adjusted under 35 U.S.C. 154(b) by 0 days.

(21) Appl. No.: 15/314,696

(22) PCT Filed: Jul. 1, 2015

(86) PCT No.: PCT/JP2015/068991
§ 371 (c)(1),
(2) Date: Nov. 29, 2016

(87) PCT Pub. No.: WO2016/002841
PCT Pub. Date: Jan. 7, 2016

(65) Prior Publication Data
US 2017/0210897 A1    Jul. 27, 2017

(30) Foreign Application Priority Data
Jul. 3, 2014    (JP) .................................. 2014-137771

(51) Int. Cl.
*C08L 69/00*     (2006.01)
*C08J 5/04*      (2006.01)

(52) U.S. Cl.
CPC .............. *C08L 69/00* (2013.01); *C08J 5/042* (2013.01); *C08J 5/043* (2013.01); *C08J 2369/00* (2013.01); *C08J 2433/08* (2013.01); *C08J 2467/00* (2013.01); *C08J 2483/10* (2013.01); *C08L 2201/02* (2013.01); *C08L 2201/08* (2013.01); *C08L 2205/03* (2013.01); *C08L 2205/035* (2013.01)

(58) Field of Classification Search
CPC ............. C08L 69/00; C08J 5/042; C08J 5/043
See application file for complete search history.

(56) References Cited

U.S. PATENT DOCUMENTS

2010/0273922 A1    10/2010 Fujimoto et al.

FOREIGN PATENT DOCUMENTS

| JP | 60088062 A | 5/1985 |
| JP | 2000355651 A | 12/2000 |
| JP | 2001240738 A | 9/2001 |
| JP | 2009155576 A | 7/2009 |
| JP | 2011-231283 A | 11/2011 |
| JP | 2011236263 A | 11/2011 |
| JP | 2012077241 A | 4/2012 |
| JP | 2013014747 A | 1/2013 |
| JP | 2014080501 A | 5/2014 |
| KR | 10-2014-0007952 A | 1/2014 |

OTHER PUBLICATIONS

International Search Report dated Jul. 28, 2015 in International Application No. PCT/JP2015/068991, and English translation thereof.
Notice of Allowance dated Jun. 9, 2017 in Korean Patent Application No. 10-2016-7034136, and English translation thereof.

*Primary Examiner* — John Uselding
(74) *Attorney, Agent, or Firm* — Plumsea Law Group, LLC

(57) ABSTRACT

A reinforced thermoplastic resin composition containing, in specific proportions, a resin main component (C) composed of a polycarbonate resin (A) and an optional graft copolymer (B), an inorganic filler (D), a glycidyl ether unit-containing polymer (E) having a weight-average molecular weight of 3,800 to 60,000 (excluding (B)), and a phosphorus-containing modified polyester-based resin (H) prepared by modifying a phosphorus-containing polyester-based resin (F), which includes a dicarboxylic acid component containing a cyclic phosphorous compound of formula (1)

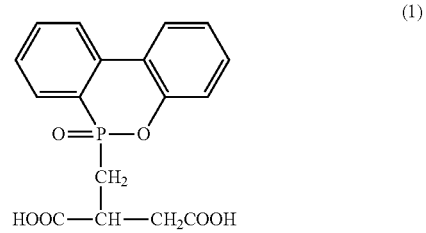

(1)

and has a phosphorus content of at least 4% by mass with a polycarbodiimide compound (G), wherein (B) is a polymer obtained by polymerizing a monomer mixture containing an aromatic alkenyl compound monomer (a) and a vinyl cyanide compound monomer (b) in the presence of a rubber-like polymer (B1).

5 Claims, 1 Drawing Sheet

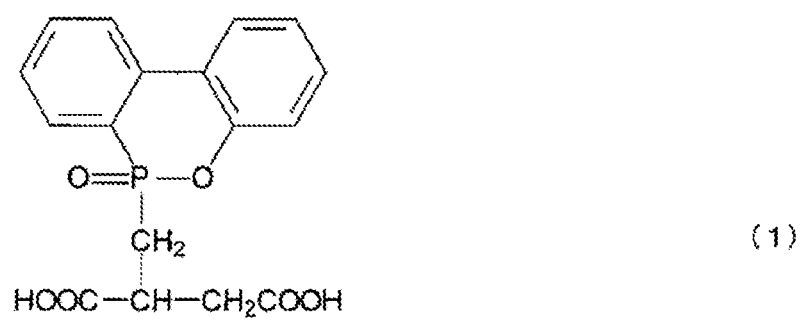
(1)

REINFORCED THERMOPLASTIC RESIN COMPOSITION AND MOLDING

CROSS-REFERENCE TO RELATED APPLICATION(S)

This application is the U.S. National Phase application of PCT application number PCT/JP2015/068991 having a PCT filing date of Jul. 1, 2015, which claims priority of Japanese patent application 2014-137771 filed on Jul. 3, 2014, the disclosures of which are hereby incorporated by reference.

TECHNICAL FIELD

The present invention relates to a thermoplastic resin composition that has been reinforced with an inorganic filler, and a molded article that uses the resin composition.

Priority is claimed on Japanese Patent Application No. 2014-137771, filed Jul. 3, 2014, the content of which is incorporated herein by reference.

BACKGROUND OF RELATED ART

Thermoplastic resin compositions such as ABS resins, resins prepared by mixing polycarbonate resins and ABS resins (also referred to as polycarbonate/ABS resins), polyamide resins and mixed resins of polycarbonate resins and polyester resins (also referred to as polycarbonate/polyester resins), or resins prepared by reinforcing these thermoplastic resin compositions with inorganic fillers, are widely used as the materials for the casings used in mobile devices such as notebook and tablet type personal computers, mobile phones including smart phones, digital cameras and digital video cameras. The method used for producing these casings typically employs a method of molding the thermoplastic resin composition by injection molding, which enables the shape of the casing to be molded with relative freedom.

In recent years, demands being made on the casings used in mobile devices include further reductions in the thickness, the ability to withstand impacts and loads when stored inside a bag or the like, and the ability to be used in an uncoated state in order to lower costs. In order to satisfy these demands, the thermoplastic resin compositions used in the casings not only require superior levels of mechanical strength such as rigidity and impact resistance when formed as a molded article, but also require superior weld strength and flame retardancy, as well as favorable moldability during the molding process.

However, because thermoplastic resin compositions such as ABS resins, polycarbonate/ABS resins, polyamide resins and polycarbonate/polyester resins that have not been reinforced with an inorganic filler have low rigidity when formed into a molded article, they are unable to satisfy the demand for thinner casings. Further, polyamide resins exhibit high hygroscopicity, and after molding, the molded article tends to be prone to warping, dimensional changes or deterioration in the external appearance over time.

Accordingly, reinforced thermoplastic resin compositions of improved rigidity prepared by adding an inorganic filler such as glass fiber or carbon fiber to the above thermoplastic resin compositions are being investigated as thermoplastic resin compositions for use in casings.

However, although reinforced thermoplastic resin compositions containing an ABS resin, polycarbonate/ABS resin or polycarbonate/polyester resin as the main component exhibit superior rigidity when formed as a molded article and enable a reduction in the wall thickness of the casing, the weld strength and impact resistance when formed as a molded article are insufficient.

In particular, reinforced thermoplastic resin compositions containing a polycarbonate/polyester resin as the main component also exhibit poor thermal stability. Further, during the molding process, if the resin is held at high temperature inside the cylinder, then a transesterification between the polycarbonate resin and the polyester resin may generate a decomposition gas, increasing the likelihood of bubbles and external appearance defects known as silver streaks within the molded article. Furthermore, there is also a possibility that as a result of a decrease in the molecular weight of the polycarbonate resin due to this transesterification, the inherent impact resistance and heat resistance and the like of the polycarbonate resin may be lost. Moreover, another problem is that the viscosity of the polycarbonate resin may change during storage at high temperature, resulting in a loss of molding stability during injection molding, and the occurrence of filling faults (also known as short shots) or overfilling (also known as burrs) in the obtained molded articles.

On the other hand, although reinforced thermoplastic resin compositions containing a polyamide resin as the main component exhibit excellent weld strength when formed into molded articles, the aforementioned problems of warping, dimensional changes and deterioration in the external appearance cannot be resolved. These problems are due to moisture absorption by the molded article after molding, and are not problems that can be resolved by drying the molding material prior to molding.

The following compositions have been proposed as reinforced thermoplastic resin compositions that are capable of forming molded articles having excellent impact resistance.

(1) A reinforced thermoplastic resin composition containing an aromatic polycarbonate resin, a graft copolymer, glass fiber that has been surface-treated with a water-soluble polyurethane, a glycidyl ether unit-containing polymer, and a phosphate ester-based flame retardant (Patent Document 1).

(2) A reinforced thermoplastic resin composition containing an aromatic polycarbonate resin, a fibrous filler that has been surface-treated with a polyamide, and a lubricant having a carboxyl group (Patent Document 2).

The following compositions have been proposed as reinforced thermoplastic resin compositions that are capable of forming molded articles having excellent mechanical strength.

(3) A reinforced thermoplastic resin composition containing a polycarbonate resin, a rubber-containing polymer, and a carbon fiber that has been bundled with a nylon-based bundling agent (Patent Document 3).

(4) A reinforced thermoplastic resin composition containing a polycarbonate resin, a rubber-like polymer, a polyethylene terephthalate that has been subjected to a deactivation treatment with a polycondensation catalyst, a milled fiber, and an olefin-based polymer having a functional group that reacts with polycarbonate (Patent Document 4).

CITATION LIST

Patent Documents

Patent Document 1: Japanese Unexamined Patent Application, First Publication No. 2013-14747
Patent Document 2: Japanese Unexamined Patent Application, First Publication No. 2001-240738
Patent Document 3: Japanese Unexamined Patent Application, First Publication No. Sho 60-88062

Patent Document 4: Japanese Unexamined Patent Application, First Publication No. 2012-77241

SUMMARY OF THE INVENTION

Disclosure of Invention

Problems to be Solved by the Invention

However, the reinforced thermoplastic resin composition of (1) has insufficient weld strength when formed as a molded article.

The reinforced thermoplastic resin composition of (2) has a problem in that the mechanical strength properties besides the impact resistance, namely the flexural strength and the tensile strength, decrease when formed as a molded article.

Although the reinforced thermoplastic resin composition of (3) exhibits superior resistance to repeated impacts when formed as a molded article, the impact resistance is unsatisfactory.

The reinforced thermoplastic resin composition of (4) has low rigidity when formed as a molded article.

Further, besides the reinforced thermoplastic resin compositions (1) to (4), a multitude of other reinforced thermoplastic resin compositions containing an added epoxy compound have been proposed with the aim of improving the mechanical strength of the molded article.

However, a reinforced thermoplastic resin composition having excellent balance between the moldability of the composition, and the weld strength, mechanical strength, impact resistance and flame retardancy of the molded article has yet to be proposed.

The present invention has an object of providing a reinforced thermoplastic resin composition that has favorable moldability, and yields a molded item having superior weld strength, rigidity, impact resistance, mechanical strength, heat resistance and flame retardancy, and also providing a molded article having superior weld strength, rigidity, impact resistance, mechanical strength, heat resistance and flame retardancy.

Means for Solving Problems

The present invention includes the following aspects.

[1] A reinforced thermoplastic resin composition including a resin main component (C), composed of 80 to 100% by mass of a polycarbonate resin (A) and 0 to 20% by mass of a graft copolymer (B) obtained by polymerizing a monomer mixture containing an aromatic alkenyl compound monomer (a) and a vinyl cyanide compound monomer (b) in the presence of a rubber-like polymer (B1) (provided that the total amount of the polycarbonate resin (A) and the graft copolymer (B) is 100% by mass), an inorganic filler (D), a glycidyl ether unit-containing polymer (E) having a glycidyl ether unit and having a weight-average molecular weight of 3,800 to 60,000 (but excluding the graft copolymer (B)), and a phosphorus-containing modified polyester-based resin (H) prepared by modifying a polyester-based resin (F) containing a phosphorus atom with a polycarbodiimide compound (G), wherein the polyester-based resin (F) is produced using a dicarboxylic acid component containing a cyclic phosphorus compound represented by formula (1) shown below as a copolymerization component, the phosphorus atom content within 100% by mass of the polyester-based resin (F) is at least 4% by mass, the proportion of the inorganic filler (D) within 100% by mass of the reinforced thermoplastic resin composition is from 20 to 50% by mass, the amount of the glycidyl ether unit-containing polymer (E) is from 1 to 10 parts by mass per 100 parts by mass of the resin main component (C), and the amount of the phosphorus-containing modified polyester-based resin (H) is from 3 to 10 parts by mass per 100 parts by mass of the resin main component (C).

[Chemical formula 1]

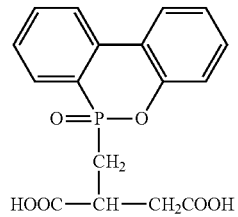

[2] The reinforced thermoplastic resin composition disclosed in [1], wherein the inorganic filler (D) is carbon fiber.

[3] The reinforced thermoplastic resin composition disclosed in [1], wherein the inorganic filler (D) is glass fiber.

[4] The reinforced thermoplastic resin composition disclosed in any one of [1] to [3], also including a phosphate ester-based flame retardant (I).

[5] A molded article obtained by molding the reinforced thermoplastic resin composition disclosed in any one of [1] to [4].

<1> A reinforced thermoplastic resin composition including a resin main component (C), either composed of a polycarbonate resin (A) or composed of a polycarbonate resin (A) and a graft copolymer (B), an inorganic filler (D), a glycidyl ether unit-containing polymer (E) having a glycidyl ether unit and having a weight-average molecular weight of 3,800 to 60,000 (but excluding the graft copolymer (B)), and a phosphorus-containing modified polyester-based resin (H) prepared by modifying a polyester-based resin (F) containing a phosphorus atom with a polycarbodiimide compound (G), wherein the graft copolymer (B) is a polymer obtained by polymerizing a monomer mixture containing an aromatic alkenyl compound monomer (a) and a vinyl cyanide compound monomer (b) in the presence of a rubber-like polymer (B1), within the resin main component (C), the amount of the polycarbonate resin (A) is from 80 to 100% by mass, the amount of the graft copolymer (B) is from 0 to 20% by mass, and the total of the polycarbonate resin (A) and the graft copolymer (B) is 100% by mass, the graft copolymer is a copolymer obtained by polymerizing the monomer mixture containing the aromatic alkenyl compound monomer (a) and the vinyl cyanide compound monomer (b) in the presence of the rubber-like polymer (B1), the polyester-based resin (F) includes a dicarboxylic acid component containing a cyclic phosphorus compound represented by formula (1) shown below, the phosphorus atom content of the polyester-based resin (F) is at least 4% by mass, the proportion of the inorganic filler (D) is from 20 to 50% by mass of the reinforced thermoplastic resin composition, the amount of the glycidyl ether unit-containing polymer (E) is from 1 to 10 parts by mass per 100 parts by mass of the resin main component (C), and the amount of the phosphorus-containing modified polyester-based resin (H) is from 3 to 10 parts by mass per 100 parts by mass of the resin main component (C).

[Chemical formula 2]

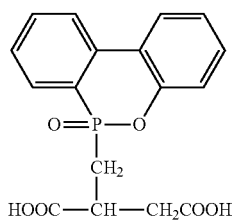

(1)

Effect of the Invention

The reinforced thermoplastic resin composition of the present invention has favorable moldability, and can improve the weld strength, rigidity, impact resistance, mechanical strength, heat resistance and flame retardancy of the obtained molded article.

The molded article of the present invention has superior weld strength, rigidity, impact resistance, mechanical strength, heat resistance and flame retardancy.

PREFERRED EMBODIMENTS OF THE INVENTION

Mode(s) for Carrying Out the Invention

The present invention is described below in detail.

In the following description, "(meth)acrylate" is a generic term meaning acrylate and methacrylate. Further, a "molded article" is an article obtained by molding the reinforced thermoplastic resin composition of the present invention.

[Reinforced Thermoplastic Resin Composition]

The reinforced thermoplastic resin composition of the present invention contains a resin main component (C), an inorganic filler (D), a glycidyl ether unit-containing polymer (E) and a phosphorus-containing modified polyester-based resin (H) as essential components. The resin main component (C) contains a polycarbonate resin (A) described below, and may also contain a graft copolymer (B). Further, the reinforced thermoplastic resin composition preferably also contains a phosphate ester-based flame retardant (I) and a flame retardant auxiliary (J).

[Resin Main Component (C)]

The resin main component (C) contains either the polycarbonate resin (A), or a combination of the polycarbonate resin (A) and the graft copolymer (B). In other words, the resin main component (C) may or may not contain the graft copolymer (B).

The proportion of the resin main component (C) relative to the total mass of the reinforced thermoplastic resin composition is preferably from 35 to 75% by mass.

Within the resin main component (C), the proportion of the polycarbonate resin (A) is from 80 to 100% by mass, and preferably from 90 to 95% by mass, relative to the total mass of the resin main component (C). Provided the proportion of the polycarbonate resin (A) falls within this range, the moldability of the reinforced thermoplastic resin composition is favorable. In particular, provided the proportion of the polycarbonate resin (A) is at least 80% by mass, the flame retardancy, mechanical strength and rigidity of the molded article improve, whereas provided the proportion is not more than 95% by mass, the moldability of the reinforced thermoplastic resin composition is more favorable.

Within the resin main component (C), the proportion of the graft copolymer (B) is from 0 to 20% by mass, and preferably from 5 to 10% by mass, relative to the total mass of the resin main component (C). Provided the proportion of the graft copolymer (B) falls within this range, the moldability of the reinforced thermoplastic resin composition is favorable. In particular, provided the proportion of the graft copolymer (B) is not more than 20% by mass, the flame retardancy, mechanical strength and rigidity of the molded article improve, and provided the proportion is at least 5% by mass, the moldability of the reinforced thermoplastic resin composition is more favorable.

The combined proportions of the polycarbonate resin (A) and the graft copolymer (B) within the resin main component (C) total 100% by mass.

<Polycarbonate Resin (A)>

The polycarbonate resin (A) is a resin prepared using a bis(hydroxyaryl) hydrocarbon as the raw material. The polycarbonate resin (A) may be either an unbranched resin or a branched resin.

A single type of the polycarbonate resin (A) may be used alone, or a combination of two or more types may be used.

[Production Method for Polycarbonate Resin (A)]

The polycarbonate resin (A) may be produced by a conventional method. For example, an unbranched polycarbonate resin (A) may be produced by a method in which a bis(hydroxyaryl) hydrocarbon is either reacted with phosgene or a carbonic acid diester, or subjected to a melt polymerization method.

Examples of the bis(hydroxyaryl) hydrocarbon include compounds having an alkyl group in an ortho position relative to the hydroxyl group of a hydroxyaryl structure.

Specific examples of preferred compounds for the bis(hydroxyaryl) hydrocarbon include 4,4'-dihydroxy-2,2'-diphenylpropane (namely, bisphenol A), tetramethylbisphenol A, and bis(4-hydroxyphenyl)-p-diisopropylbenzene.

A branched polycarbonate resin (A) is produced by subjecting the bis(hydroxyaryl) hydrocarbon, and a compound having at least three structures composed of a hydroxyl group bonded to a benzene ring, such as a poly(hydroxyaryl) hydrocarbon, to either a reaction with phosgene or a carbonic acid diester, or a melt polymerization method. For example, a branched polycarbonate resin (A) may be produced by using 98 to 99.8 mol % of the bis(hydroxyaryl) hydrocarbon and 0.2 to 2 mol % of the poly(hydroxyaryl) hydrocarbon, relative to the total mass of the bis(hydroxyaryl) hydrocarbon and the compound having at least three structures composed of a hydroxyl group bonded to a benzene ring. Specific examples of the compound having at least three structures composed of a hydroxyl group bonded to a benzene ring, such as the poly(hydroxyaryl) hydrocarbon, include phloroglucinol, 4,6-dimethyl-2,4,6-tris-(4-hydroxyphenyl)-heptene, 4,6-dimethyl-2,4,6-tris-(4-hydroxyphenyl)-heptane, and 1,3,5-tris-(4-hydroxyphenyl)-benzene.

Materials made by recycling compact discs and the like may also be used as the polycarbonate resin (A).

[Viscosity Average Molecular Weight of Polycarbonate Resin (A)]

The viscosity average molecular weight (Mv) of the polycarbonate resin (A) is preferably from 15,000 to 35,000. Provided the viscosity average molecular weight of the polycarbonate resin (A) is at least 15,000, the impact resistance of the molded article can be further improved. Provided the viscosity average molecular weight of the polycarbonate resin (A) is not more than 35,000, the moldability of the reinforced thermoplastic resin composition improves.

In terms of achieving a superior balance between the mechanical strength and impact resistance of the molded article and the fluidity of the reinforced thermoplastic resin composition, the viscosity average molecular weight of the polycarbonate resin (A) is more preferably from 17,000 to 25,000.

The viscosity average molecular weight of the polycarbonate resin (A) can be determined, for example, by the solution viscosity method. When a commercially available polycarbonate resin (A) is used, the catalog value may be used.

<Graft Copolymer (B)>

The graft copolymer (B) is obtained by polymerizing a monomer mixture containing an aromatic alkenyl compound monomer (a) and a vinyl cyanide compound monomer (b) in the presence of a rubber-like polymer (B1), and is a copolymer in which molecular chains (B2) having units of the aromatic alkenyl compound monomer (a) and units of the vinyl cyanide compound monomer (b) are grafted to the rubber-like polymer (B1).

A single type of the graft copolymer (B) may be used alone, or a combination of two or more types may be used.

[Rubber-like Polymer (B1)]

Examples of the rubber-like polymer (B1) include butadiene rubber, styrene-butadiene rubber, acrylonitrile-butadiene rubber, isoprene rubber, chloroprene rubber, butyl rubber, ethylene-propylene rubber, acrylic rubber, ethylene-propylene-non-conjugated diene rubber, epichlorohydrin rubber, diene-acrylic composite rubber, and silicone (polysiloxane)-acrylic composite rubber. Among these, in terms of achieving more favorable plating performance for the molded article, butadiene rubber, styrene-butadiene rubber, acrylonitrile-butadiene rubber, acrylic rubber, diene-acrylic composite rubber, and silicone-acrylic composite rubber are preferred, and in terms of achieving more favorable flame retardancy for the molded article, silicone-acrylic composite rubber is particularly desirable.

In the present invention, a composite rubber describes either a rubber obtained by copolymerizing two rubber components, or a polymerized rubber having an IPN structure in which the components are mutually intertwined to the point of being inseparable.

(Butadiene Rubber)

In the butadiene rubber, the proportion of the butadiene monomer relative to the total mass of monomers forming the butadiene rubber is preferably from 95 to 100% by mass. Examples of other monomers that may be included in the butadiene rubber include alkyl (meth)acrylates such as n-butyl acrylate or methacrylate.

(Acrylic Rubber)

In the acrylic rubber, the proportion of alkyl (meth)acrylate relative to the total mass of monomers forming the acrylic rubber is preferably from 95 to 100% by mass.

(Diene-acrylic Composite Rubber)

The diene component of the diene-acrylic composite rubber preferably contains at least 50% by mass but less than 100% by mass, and more preferably at least 95% by mass but not more than 99% by mass, of butadiene units relative to the total mass of all the monomers that constitute the diene component of the diene-acrylic composite rubber. Examples of the diene component include butadiene rubber, styrene-butadiene rubber and acrylonitrile-butadiene rubber.

The acrylic rubber component of the diene-acrylic composite rubber is obtained by polymerizing an alkyl (meth)acrylate (f) and a polyfunctional monomer (g).

Examples of the alkyl (meth)acrylate (f) include alkyl acrylates such as methyl acrylate, ethyl acrylate, n-propyl acrylate, n-butyl acrylate and 2-ethylhexyl acrylate, and alkyl methacrylates such as hexyl methacrylate, 2-ethylhexyl methacrylate and n-lauryl methacrylate. A single type of the alkyl (meth)acrylate (f) may be used alone, or a combination of two or more types may be used.

Examples of the polyfunctional monomer (g) include allyl methacrylate, ethylene glycol dimethacrylate, propylene glycol dimethacrylate, 1,3-butylene glycol dimethacrylate, 1,4-butylene glycol dimethacrylate, triallyl cyanurate and triallyl isocyanurate. A single type of the polyfunctional monomer (g) may be used alone, or a combination of two or more types may be used.

Examples of the composite structure of the diene-acrylic composite rubber include a core-shell structure in which the periphery of the diene component is coated with the acrylic rubber component, a core-shell structure in which the periphery of the acrylic rubber component is coated with the diene component, a structure in which the diene component and the acrylic rubber component are mutually intertwined, and a copolymer structure in which a diene-based monomer unit and an alkyl (meth)acrylate-based monomer unit are arranged randomly.

(Silicone-acrylic Composite Rubber)

The silicone component of the silicone-acrylic composite rubber contains a polyorganosiloxane as the main component. In the present invention, a polyorganosiloxane describes a polymer formed from alternately bonded silicon and oxygen, in which organic groups are bonded to the silicon. The silicone component is preferably a polyorganosiloxane having a vinyl polymerizable functional group.

The acrylic rubber component of the silicone-acrylic composite rubber is the same as the acrylic rubber component of the aforementioned diene-acrylic composite rubber.

Examples of the composite structure of the silicone-acrylic composite rubber include a core-shell structure in which the periphery of the silicone component is coated with the acrylic rubber component, a core-shell structure in which the periphery of the acrylic rubber component is coated with the silicone component, a structure in which the silicone component and the acrylic rubber component are mutually intertwined, and a network type rubber structure in which segments of the polyorganosiloxane and segments of the poly(alkyl (meth)acrylate) are mutually bonded together both linearly and three-dimensionally.

(Production Method for Rubber-like Polymer (B1))

The rubber-like polymer (B1) is produced, for example, by subjecting the monomers that form the rubber-like polymer (B1) to emulsion polymerization in the presence of a radical polymerization initiator. By using a preparation method that employs an emulsion polymerization, the particle size of the rubber-like polymer (B1) can be readily controlled.

In terms of enabling further improvement in the impact resistance of the molded article, the average particle size of the rubber-like polymer (B1) is preferably from 0.1 to 0.6 μm.

The polymerization rate for the rubber-like polymer (B1) is preferably from 85 to 99% by mass. The polymerization rate can be calculated by a method of measuring the amount of unreacted monomers, and then determining the change in the amount of rubber-like polymer produced by the reaction.

The average particle size is a value measured, for example, by a dynamic light scattering method.

(Amount of Rubber-like Polymer (B1))

The amount of the rubber-like polymer (B1), relative to the total mass (100% by mass) of the resin main component (C), is preferably from 0.5 to 3.5% by mass. Provided the amount of the rubber-like polymer (B1) is at least 0.5% by mass, the impact resistance of the molded article can be further improved. Provided the amount of the rubber-like polymer (B1) is not more than 3.5% by mass, the moldability of the reinforced thermoplastic resin composition improves, and the external appearance of the molded article is more favorable.

(Weight Average Molecular Weight of Rubber-Like Polymer (B1))

The weight average molecular weight of the rubber-like polymer (B1) is preferably from 20,000 to 200,000, and more preferably from 40,000 to 150,000.

The weight average molecular weight of the rubber-like polymer (B1) can be determined, for example, by gel permeation chromatography (GPC).

[Molecular Chains (B2)]

The molecular chains (B2) have units of the aromatic alkenyl compound monomer (a) and units of the vinyl cyanide compound monomer (b) as essential components, and may also have units of other monomers (c) capable of copolymerization with these essential components as optional components. In terms of achieving a superior balance between the impact resistance of the molded article and the moldability of the reinforced thermoplastic resin composition, the proportion of each monomer relative to the total mass of all the monomers that constitute the molecular chains (B2) is set such that the proportion of units of the aromatic alkenyl compound monomer (a) is preferably from 50 to 90% by mass, the proportion of units of the vinyl cyanide compound monomer (b) is preferably from 10 to 50% by mass, and the proportion of units of the other monomers (c) is from 0 to 40% by mass. The molecular chains (B2) are more preferably molecular chains in which the proportion of units of the aromatic alkenyl compound monomer (a) is from 60 to 80% by mass, the proportion of units of the vinyl cyanide compound monomer (b) is from 20 to 40% by mass, and there are no other monomers. The total of the proportions of the monomers (a) to (c) is 100% by mass.

Examples of the aromatic alkenyl compound monomer (a) include styrene, α-methylstyrene and vinyltoluene, and styrene is preferred.

Examples of the vinyl cyanide compound monomer (b) include acrylonitrile and methacrylonitrile, and acrylonitrile is preferred.

Examples of the other monomer (c) include alkyl methacrylates such as methyl methacrylate, ethyl methacrylate and 2-ethylhexyl methacrylate, alkyl acrylates such as methyl acrylate, ethyl acrylate and butyl acrylate, and maleimide compounds such as N-phenylmaleimide.

[Weight-average Molecular Weight of Graft Copolymer (B)]

The weight-average molecular weight of the graft copolymer (B) is preferably from 35,000 to 600,000, and more preferably from 55,000 to 500,000, or from 100,000 to 450,000.

Further, the weight-average molecular weight of the graft copolymer (B) defined here refers to the molecular weight of the polymer contained within the acetone-soluble fraction. Measurement of the weight-average molecular weight may be performed by a method in which the acetone-soluble fraction is dissolved in tetrahydrofuran, the solution is measured by gel permeation chromatography (GPC), and the polystyrene-equivalent weight-average molecular weight (Mw) is then calculated.

The graft copolymer (B) is a copolymer in which the molecular chains (B2) having units of the aromatic alkenyl compound monomer (a) and units of the vinyl cyanide compound monomer (b) as essential components, and having units of other copolymerizable monomers (c) as optional components, are bonded as graft chains to the rubber-like polymer (B1), and is composed of a core portion formed from the composite rubber-like polymer (A) and an outer layer portion formed from the molecular chains (B2).

[Acetone-insoluble Fraction and Acetone-soluble Fraction of Graft Copolymer (B)]

The graft copolymer (B) preferably contains an acetone-insoluble fraction of 70 to 99% by mass, and the reduced viscosity of the acetone-soluble fraction, measured at 25° C. as a 0.2 g/dl N,N-dimethylformamide solution, is preferably from 0.3 to 0.7 dl/g.

Provided the acetone-insoluble fraction is at least 70% by mass, the surface external appearance of the molded article is more favorable, and the moldability of the reinforced thermoplastic resin composition improves. Provided the fraction that is insoluble in acetone solvent is not more than 99% by mass, the tear strength of the molded article improves.

Provided the reduced viscosity of the acetone-soluble fraction is at least 0.3 dl/g, the tear strength of the molded article improves. Provided the reduced viscosity of the acetone-soluble fraction is not more than 0.7 dl/g, the surface external appearance of the molded article is more favorable, and the moldability of the reinforced thermoplastic resin composition improves.

The method used for measuring the acetone-soluble fraction is as follows.

First, 2.5 g of the graft copolymer is immersed in 90 ml of acetone, and following heating at 65° C. for 3 hours, a centrifugal separation is performed at 1,500 rpm for 30 minutes using a centrifuge. Subsequently, the supernatant is removed, the residue is dried in a vacuum dryer at 65° C. for 12 hours, and the dried sample is then weighed. Based on the difference in mass (2.5 g—the dried sample mass), the proportion (%) of the acetone-soluble fraction in the graft copolymer can be determined. The reduced viscosity of the acetone-soluble fraction is measured at 25° C. as a 0.2 g/dl N,N-dimethylformamide solution.

The acetone-soluble fraction is the same polymer as the molecular chains (B2), but is not grafted to the rubber-like polymer (B1). The acetone-soluble fraction is often produced at the same time as the grafting of the molecular chains (B2) to the rubber-like polymer (B1). Accordingly, the graft copolymer (B) usually includes an acetone-soluble fraction and an acetone-insoluble fraction.

[Production Method for Graft Copolymer (B)]

The graft copolymer (B) is obtained by performing a graft polymerization of the aromatic alkenyl compound monomer (a), the vinyl cyanide compound monomer (b), and if required any other monomers (c), in the presence of the rubber-like polymer (B1).

The graft polymerization method is preferably an emulsion polymerization method. Further, during the graft polymerization, any of various chain transfer agents may be added to alter the molecular weight of the graft copolymer (B), the graft ratio, or the reduced viscosity of the acetone-soluble fraction.

<Inorganic Filler (D)>

Examples of the inorganic filler (D) include inorganic fibers such as glass fiber and carbon fiber; metal-coated inorganic fibers; inorganic materials such as wollastonite, talc, mica, glass flakes, glass beads, potassium titanate, calcium carbonate, magnesium carbonate, carbon black and ketchen black; metals such as iron, copper, zinc and aluminum, and alloys thereof; and fibers and powders of oxides of these metals. Among these, in terms of achieving a high level of rigidity with a small amount of the filler, the use of glass fiber or carbon fiber is preferred.

A single type of the inorganic filler (D) may be used alone, or a combination of two or more types may be used.

The aforementioned inorganic fibers, metal-coated inorganic fibers, inorganic materials, metals and alloys, and fibers and powders of oxides thereof may be surface-treated using a conventional coupling agent (such as a silane-based coupling agent or a titanate-based coupling agent) or some other form of surface treatment agent.

Further, the glass fiber or carbon fiber may be coated or bundled with a thermoplastic resin such as an ethylene/vinyl acetate copolymer or a polyamide, or a thermosetting resin such as a polyurethane resin or an epoxy resin.

The ratio between the major axis and the minor axis (hereafter also referred to as major axis/minor axis) in a fiber cross-section of the glass fiber or carbon fiber is preferably from 2 to 6, and more preferably from 2 to 4. Provided the value of major axis/minor axis is at least 2, favorable impact resistance and strength can be obtained. Provided the value of major axis/minor axis is not more than 6, favorable moldability, namely extrusion workability, can be obtained. Further, the major axis is preferably from 7 to 28 nm.

The ratio of major axis/minor axis in the fiber cross-section is determined, for example, by using an electron microscope to observe the fiber cross-section at 8 different locations, and then averaging the value of major axis/minor axis across these 8 locations. When a commercially available fiber is used, the catalog value may be used.

Further, the glass fiber or carbon fiber may be composed of long fibers or short fibers. However, short fibers having minimal anisotropy are preferred as the glass fiber or carbon fiber, and chopped fibers are particularly preferred.

A single type of the inorganic filler (D) may be used alone, or a combination of two or more types may be used.

[Proportion of Inorganic Filler (D)]

The proportion of the inorganic filler (D), relative to the total mass of the reinforced thermoplastic resin composition, is from 20 to 50% by mass, and preferably from 30 to 45% by mass. Provided the proportion of the inorganic filler (D) is at least 20% by mass, the rigidity and the like of the molded article improve. Provided the proportion of the inorganic filler (D) is not more than 50% by mass, the moldability of the reinforced thermoplastic resin composition is more favorable.

<Glycidyl Ether Unit-containing Polymer (E)>

The glycidyl ether unit-containing polymer (E) is a polymer that has a glycidyl ether unit within the molecule. Polymers containing halogen atoms such as bromine and block polymers are not included in the glycidyl ether unit-containing polymer (E).

Examples of the glycidyl ether unit-containing polymer (E) include glycidyl ether type epoxy resins obtained by the reaction of a compound having a hydroxyl group with epichlorohydrin.

Examples of these glycidyl ether type epoxy resins include bisphenol type epoxy resins, novolac type epoxy resins, polyglycidyl ethers of aliphatic polyhydric alcohols, and high-molecular weight compounds such as biphenyl type epoxy resins having a molecular chain which includes a repeating unit represented by formula (2) shown below (for example, epoxy group-containing phenoxy resins).

[Chemical formula 3]

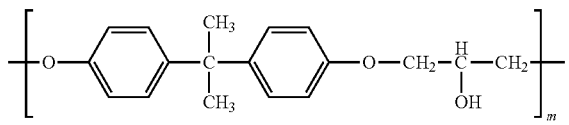

In the formula, m represents an integer of 1 or greater.

Further, m is preferably from 13 to 211, and more preferably from 19 to 176.

Examples of the bisphenol type epoxy resins include bisphenol A type epoxy resins, bisphenol F type epoxy resins, bisphenol AD type epoxy resins, and epoxy resins having bisphenol A and bisphenol F structures.

Examples of the novolac type epoxy resins include phenol novolac type epoxy resins and cresol novolac type epoxy resins.

Examples of the polyglycidyl ethers of aliphatic polyhydric alcohols include alkylene glycol diglycidyl ethers such as ethylene glycol diglycidyl ether; polyoxyalkylene glycol diglycidyl ethers such as diethylene glycol diglycidyl ether, polyethylene glycol diglycidyl ether, dipropylene glycol diglycidyl ether, tripropylene glycol diglycidyl ether and polypropylene glycol diglycidyl ether; and glycerol triglycidyl ether.

In terms of further enhancing the mechanical strength of the molded article, the glycidyl ether unit-containing polymer (E) is preferably a bisphenol A type epoxy resin, bisphenol F type epoxy resin, epoxy resin having bisphenol A and bisphenol F structures, phenol novolac type epoxy resin, cresol novolac type epoxy resin, or epoxy group-containing phenoxy resin. The glycidyl ether unit-containing polymer (E) is more preferably a bisphenol A type epoxy resin or an epoxy group-containing phenoxy resin.

The glycidyl ether unit-containing polymer (E) may be a liquid, a semisolid or a solid at normal temperatures (for example, 20° C.). If consideration is given to the workability and the like during mixing and kneading, then a solid is preferred.

A single type of the glycidyl ether type epoxy resin may be used alone, or a combination of two or more types may be used.

[Weight Average Molecular Weight of Glycidyl Ether Unit-containing Polymer (E)]

The weight average molecular weight of the glycidyl ether unit-containing polymer (E) is from 3,800 to 60,000, and is preferably from 5,500 to 50,000. Provided the weight average molecular weight of the glycidyl ether unit-containing polymer (E) is at least 3,800, the impact resistance of the molded article improves. Provided the weight average molecular weight of the glycidyl ether unit-containing polymer (E) is not more than 60,000, the moldability of the reinforced thermoplastic resin composition and the flame retardancy of the molded article are more favorable.

The weight average molecular weight of the glycidyl ether unit-containing polymer (E) can be determined by mass spectrometry. When a commercially available glycidyl ether unit-containing polymer (E) is used, the catalog value may be used.

[Method for Obtaining Glycidyl Ether Unit-containing Polymer (E)]

Examples of commercially available products of the glycidyl ether unit-containing polymer (E) include the jER (a registered trademark) series manufactured by Mitsubishi Chemical Corporation, the Epotohto (a registered trademark) series and Phenotohto (a registered trademark) series manufactured by Nippon Steel & Sumikin Chemical Co., Ltd., the AER (a registered trademark) series manufactured by Asahi Kasei E-Materials Corporation, and the EPICLON (a registered trademark) series manufactured by DIC Corporation.

[Amount of Glycidyl Ether Unit-containing Polymer (E)]

The amount of the glycidyl ether unit-containing polymer (E) is from 1 to 10 parts by mass, and preferably from 3 to 8 parts by mass, per 100 parts by mass of the resin main component (C). Provided the amount of the glycidyl ether unit-containing polymer (E) is at least 1 part by mass, the impact resistance and weld strength of the molded article improve. Provided the amount of the glycidyl ether unit-containing polymer (E) is not more than 10 parts by mass, the moldability of the reinforced thermoplastic resin composition and the flame retardancy of the molded article are more favorable.

<Phosphorus-containing Modified Polyester-based Resin (H)>

The phosphorus-containing modified polyester-based resin (H) is a resin obtained by modifying a polyester-based resin (F) containing a phosphorus atom with a polycarbodiimide compound (G).

A single type of the phosphorus-containing modified polyester-based resin (H) may be used alone, or a combination of two or more types may be used.

[Polyester-based Resin (F)]

The polyester-based resin (F) contains phosphorus atoms, and mainly acts as a flame retardant. The phosphorus atom content of the polyester-based resin (F) is at least 4% by mass. Provided the phosphorus atom content is at least 4% by mass, the flame retardancy improvement effect provided by the polyester-based resin (F) can be realized satisfactorily. From the viewpoint of industrial mass producibility, the phosphorus atom content is preferably not more than 6% by mass, and is more preferably at least 4% by mass but not more than 6% by mass.

The polyester-based resin (F) is produced using a dicarboxylic acid component containing a cyclic phosphorus compound represented by formula (1) shown below as a copolymerization component.

[Chemical formula 4]

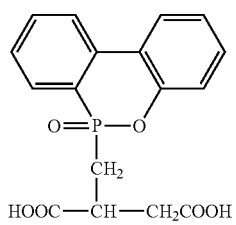

(1)

The cyclic phosphorus compound represented by formula (1) above can be produced by an addition reaction between 9,10-dihydro-9-oxa-10-phosphaphenanthrene-10-oxide (hereafter sometimes abbreviated as "DOP") represented by formula (3) shown below, and itaconic acid represented by formula (4) shown below. This addition reaction can be initiated during the polyester production process.

Accordingly, the polyester-based resin (F) can be produced, for example, by the method disclosed in International Patent Publication No. WO2006/057228, but may also be produced by using a conventional method to conduct a polycondensation reaction using polyester production raw materials (copolymerization components) including DOP, itaconic acid and other dicarboxylic acid components, and a diol component.

[Chemical formula 5]

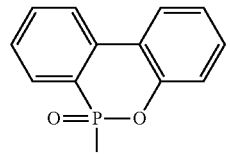

(3)

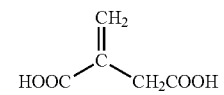

(4)

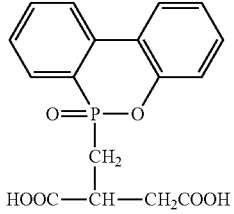

(1)

In particular, the polyester-based resin (F) is preferably a resin obtained by reacting terephthalic acid and/or an ester derivative thereof (such as dimethyl terephthalate), the cyclic phosphorus compound represented by formula (1) above, together with a dicarboxylic acid component containing a trifunctional or higher polyvalent carboxylic acid component, and a diol component.

The proportion of the terephthalic acid and/or ester derivative thereof, relative to the total amount of the dicarboxylic acid component used in the reaction, is preferably at least 49.5 mol %, and more preferably from 55 to 69.5 mol %.

The proportion of the cyclic phosphorus compound represented by formula (1) above, relative to the total amount of the dicarboxylic acid component used in the reaction, is preferably at least 29.5 mol %, and more preferably from 30 to 49.5 mol %.

The proportion of the trifunctional or higher polyvalent carboxylic acid component, relative to the total amount of the dicarboxylic acid component used in the reaction, is preferably at from 0.05 to 2.0 mol %, and more preferably from 0.30 to 0.70 mol %.

The combined total of the terephthalic acid and/or ester derivative thereof, the cyclic phosphorus compound represented by formula (1) above, and the trifunctional or higher polyvalent carboxylic acid component is 100 mol %.

Provided the proportion of the terephthalic acid and/or ester derivative thereof is at least as large as the above lower limit, the material itself is unlikely to become brittle, and the productivity improves, meaning industrial mass production is possible.

On the other hand, provided the proportion of the terephthalic acid and/or ester derivative thereof is not more than the above upper limit, the proportions of the cyclic phosphorus compound represented by formula (1) above and the trifunctional or higher polyvalent carboxylic acid component can be ensured, meaning the effects due to these components can be satisfactorily realized.

Provided the proportion of the cyclic phosphorus compound represented by formula (1) above falls within the above range, the phosphorus atom content of the polyester-based resin (F) can easily be set within the range mentioned above.

The trifunctional or higher polyvalent carboxylic acid component is used to promote, via a thickening effect, the polymerization reaction that uses the cyclic phosphorus compound represented by formula (1) above, and provided the proportion of the trifunctional or higher polyvalent carboxylic acid component is at least as large as the above lower limit, this thickening effect is satisfactorily realized, whereas provided the proportion is not more than the above upper limit, the polymerization reaction can be controlled easily.

Examples of the trifunctional or higher polyvalent carboxylic acid component include trimellitic acid, ethanetricarboxylic acid, propanetricarboxylic acid, butanetetracarboxylic acid, pyromellitic acid, trimesic acid, 3,4,3',4'-biphenyltetracarboxylic acid, and ester derivatives of these acids.

On the other hand, examples of the diol component include ethylene glycol and ethylene oxide.

Other dicarboxylic acid components besides those mentioned above and trifunctional or higher polyhydric polyol components and the like may also be used as production raw materials for the polyester-based resin (F).

In terms of the flame retardancy, impact resistance and heat resistance of the molded article, the intrinsic viscosity of the polyester-based resin (F) is preferably from 0.4 to 0.7 dl/g. When polymers of the same type are measured using the same solvent and temperature, a higher intrinsic viscosity indicates a larger molecular weight. If the intrinsic viscosity is lower than this range, then the external appearance, impact resistance or heat resistance of the molded article may deteriorate, whereas if the intrinsic viscosity is higher than this range, the flame retardancy may sometimes deteriorate.

Commercially available products may also be used as the polyester-based resin (F), and examples include the product "VYLON GH250" manufactured by Toyobo Co., Ltd.

[Polycarbodiimide Compound (G)]

In the present description, the polycarbodiimide compound (G) describes a compound having at least one carbodiimide group, namely at least one group represented by —N=C=N—, per molecule. Conventional compounds can be used as this type of polycarbodiimide compound without any particular limitations.

Specific examples of the polycarbodiimide compound include mono and polycarbodiimides such as dicyclohexylcarbodiimide, diisopropylcarbodiimide, diisobutylcarbodiimide, dioctylcarbodiimide, octyldecylcarbodiimide, di-t-butylcarbodiimide, dibenzylcarbodiimide, diphenylcarbodiimide, N-octadecyl-N'-phenylcarbodiimide, N-benzyl-N'-phenylcarbodiimide, N-benzyl-N'-tolylcarbodiimide, di-o-tolylcarbodiimide, di-p-tolylcarbodiimide, bis(p-aminophenyl)carbodiimide, bis(p-chlorophenyl)carbodiimide, bis(o-chlorophenyl)carbodiimide, bis(o-ethylphenyl)carbodiimide, bis(p-ethylphenyl)carbodiimide, bis(o-isopropylphenyl)carbodiimide, bis(p-isopropylphenyl)carbodiimide, bis(o-isobutylphenyl)carbodiimide, bis(p-isobutylphenyl)carbodiimide, bis(2,5-dichlorophenyl)carbodiimide, bis(2,6-dimethylphenyl)carbodiimide, bis(2,6-diethylphenyl)carbodiimide, bis(2-ethyl-6-isopropylphenyl)carbodiimide, bis(2-butyl-6-isopropylphenyl)carbodiimide, bis(2,6-diisopropylphenyl)carbodiimide, bis(2,6-di-t-butylphenyl)carbodiimide, bis(2,4,6-trimethylphenyl)carbodiimide, bis(2,4,6-triisopropylphenyl)carbodiimide, bis(2,4,6-tributylphenyl)carbodiimide, di-β-naphthylcarbodiimide, N-tolyl-N'-cyclohexylcarbodiimide, N-tolyl-N'-phenylcarbodiimide, p-phenylenebis(o-tolylcarbodiimide), p-phenylenebis(cyclohexylcarbodiimide), p-phenylenebis(p-chlorophenylcarbodiimide), 2,6,2',6'-tetraisopropyldiphenylcarbodiimide, hexamethylenebis(cyclohexylcarbodiimide), ethylenebis(phenylcarbodiimide) and ethylenebis(cyclohexylcarbodiimide).

Among these, from the viewpoints of reactivity and stability, bis(2,6-diisopropylphenyl)carbodiimide and 2,6,2',6'-tetraisopropyldiphenylcarbodiimide are preferred.

Commercially available products may also be used as the polycarbodiimide compound (G), and any of the various grades marketed by Nisshinbo Chemical Inc. under the brand name "CARBODILITE" may be used.

[Production Method for Phosphorus-containing Modified Polyester-based Resin (H)]

The phosphorus-containing modified polyester-based resin (H) is obtained by modifying the polyester-based resin (F) described above with the polycarbodiimide compound (G). In other words, the phosphorus-containing modified polyester-based resin (H) has a structure represented by HR6NCONR5OC— obtained by reacting the carboxyl group of the polyester-based resin (F) and the carbodiimide group of the polycarbodiimide compound (R5-N=C=N—R6). Each of R5 and R6 represents either a hydrogen atom or an organic group.

The phosphorus-containing modified polyester-based resin (H) has a characteristic peak between 2200 and 2300 cm−1 in the infrared absorption spectrum that is not detected for the polyester-based resin (F) or the polycarbodiimide compound (G).

Conventional methods may be employed for the modification method, and one example is a method in which the polyester-based resin (F) and the polycarbodiimide compound (G) are kneaded using a twin screw extruder. The mixing ratio is set so that the amount of the polycarbodiimide compound (G) is preferably from 0.2 to 1 part by mass, and more preferably from 0.5 to 0.8 parts by mass, per 100 parts by mass of the polyester-based resin (F). Provided the amount of the polycarbodiimide compound (G) relative to the polyester-based resin (F) is at least 0.2 parts by mass, the polyester-based resin (F) is adequately modified and the weld strength is enhanced, whereas provided the amount is not more than 1.0 parts by mass, unmodified polycarbodiimide compound (G) is less likely to remain, and the impact resistance can be maintained at a favorable level.

[Amount of Phosphorus-containing Modified Polyester-based Resin (H)]

The amount of the phosphorus-containing modified polyester-based resin (H) is from 3 to 10 parts by mass, and preferably from 5 to 8 parts by mass, per 100 parts by mass of the resin main component (C). Provided the amount of the phosphorus-containing modified polyester-based resin (H) is at least 3 parts by mass, the weld strength of the molded article improves. Provided the amount of the phosphorus-containing modified polyester-based resin (H) is not more than 10 parts by mass, the flame retardancy of the molded article is more favorable. Further, any deterioration in the weld strength can be suppressed.

<Flame Retardants>

Flame retardants may be added to the reinforced thermoplastic resin composition of the present invention.

Examples of these flame retardants include phosphate ester-based flame retardants (I) and conventional halogen-free flame retardants.

[Phosphate Ester-based Flame Retardant (I)]

Examples of the phosphate ester-based flame retardant (I) include compounds represented by formula (5) shown below.

[Chemical formula 6]

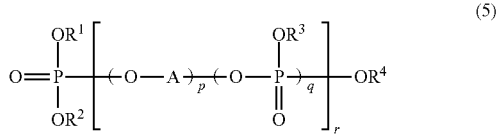

(5)

In the formula, each of R1, R2, R3 and R4 independently represents a hydrogen atom or an organic group, provided that R1, R2, R3 and R4 are not all simultaneously hydrogen atoms, A represents a divalent or higher organic group, p represents 0 or 1, q represents an integer of 1 or greater, and r represents an integer of 0 or greater.

Examples of the organic groups include alkyl groups which may be substituted, such as a methyl group, ethyl group, butyl group and octyl group; cycloalkyl groups such as a cyclohexyl group; and aryl groups such as a phenyl group and alkyl group-substituted phenyl groups. When the organic groups are substituted, there are no particular limitations on the number of substituents, provided the number is chemically permissible. Examples of substituted organic groups include alkoxy groups, alkylthio groups, aryloxy groups and arylthio groups. Combinations of these substituents (such as arylalkoxyalkyl groups) and groups in which these substituents have been bonded together via an oxygen atom, nitrogen atom or sulfur atom or the like (such as arylsulfonylaryl groups) are also possible.

A divalent or higher organic group is a divalent or higher functional group obtained by removing 2 or more carbon atom-bound hydrogen atoms from one of the above organic groups. Examples include alkylene groups, phenylene groups, and substituted phenylene groups. The position of each hydrogen atom removed from a carbon atom is arbitrary. A is preferably a divalent organic group.

Specific examples of the phosphate ester-based flame retardant (I) include trimethyl phosphate, triethyl phosphate, tributyl phosphate, trioctyl phosphate, tributoxyethyl phosphate, triphenyl phosphate, tricresyl phosphate, trixylyl phosphate, cresyldiphenyl phosphate, xylyldiphenyl phosphate, octyldiphenyl phosphate, diphenyl-2-ethylcresyl phosphate, tris(isopropylphenyl) phosphate, resorcinoldiphenyl phosphate, and polyphosphates (such as bisphenol A bisphosphate, hydroquinone bisphosphate, resorcinol bisphosphate, trioxybenzene trisphosphate, bisphenol A bis(dicresyl phosphate), bisphenol A bis(diphenyl phosphate), phenylenebis(diphenyl phosphate), phenylenebis(ditolyl phosphate), and phenylenebis(dixylyl phosphate)).

Among the above phosphate ester-based flame retardants (I), triphenyl phosphate, bisphenol A bis(diphenyl phosphate), phenylenebis(diphenyl phosphate) and phenylenebis(dixylyl phosphate) are preferred.

The polyphosphates can be obtained, for example, by a dehydration condensation of any of various diols such as polynuclear phenols (for example, bisphenol A) and orthophosphoric acid. Specific examples of the diols include hydroquinone, resorcinol, diphenylolmethane, diphenyloldimethylmethane, dihydroxybiphenyl, p,p'-dihydroxydiphenyl sulfone, and dihydroxynaphthalene.

(Weight Average Molecular Weight of Phosphate Ester-based Flame Retardant (I))

The weight average molecular weight of the phosphate ester-based flame retardant (I) is preferably at least 326, more preferably greater than 326, and still more preferably 550 or greater. In particular, by using a phosphate ester-based flame retardant (I) having a weight average molecular weight exceeding 326, the moldability of the reinforced thermoplastic resin composition can be improved, and a molded article of excellent external appearance can be obtained. In terms of the flame retardancy of the molded article, the upper limit for the weight average molecular weight of the phosphate ester-based flame retardant (I) is preferably not more than 692, more preferably not more than 690, and most preferably 686 or less. The weight average molecular weight of the phosphate ester-based flame retardant (I) is preferably at least 326 but not more than 692, more preferably greater than 326 but not more than 690, and most preferably at least 550 but not more than 686.

The weight average molecular weight of the phosphate ester-based flame retardant (I) can be determined by mass spectrometry. When a commercially available phosphate ester-based flame retardant (I) is used, the catalog value may be used.

(Method for Obtaining Phosphate Ester-based Flame Retardant (I))

Examples of commercially available products of the phosphate ester-based flame retardant (I) include the FP series manufactured by ADEKA Corporation, the Kronitex (a registered trademark) series manufactured by Ajinomoto Fine-Techno Co., Inc., the Reofos (a registered trademark) series manufactured by Chemtura Japan Ltd., and the CR series and PX series manufactured by Daihachi Chemical Industry Co., Ltd.

(Amount of Phosphate Ester-based Flame Retardant (I))

The amount of the phosphate ester-based flame retardant (I) is preferably from 1 to 25 parts by mass, and more preferably from 3 to 23 parts by mass, per 100 parts by mass of the resin main component (C). Provided the amount of the phosphate ester-based flame retardant (I) is at least 1 part by mass, the moldability of the molded article is more favorable. Provided the amount of the phosphate ester-based flame retardant (I) is not more than 25 parts by mass, the impact resistance and heat resistance of the molded article are further improved.

[Halogen-free Flame Retardant]

Examples of the halogen-free flame retardant include phosphazene, phosphorus-containing polyesters and inorganic flame retardants such as red phosphorus and aluminum hydroxide.

Examples of red phosphorus-based flame retardants that may be used include materials that have been stabilized by coating with a thermosetting resin, and materials that have been stabilized by coating with a thermosetting resin and a metal hydroxide. Red phosphorus-based flame retardants are combustible if used alone, but may be master-batched by preliminary mixing with at least a portion of the resin main component (C) or the polycarbonate resin (A).

<Flame Retardant Auxiliary (J)>

A flame retardant auxiliary (J) may be added to the reinforced thermoplastic resin composition of the present invention to prevent dripping of the composition upon combustion. Examples of the flame retardant auxiliary include polytetrafluoroethylene, compounds having a tetrafluoroethylene unit, and silicone-based polymers.

When polytetrafluoroethylene or a compound having a tetrafluoroethylene unit is added as the flame retardant auxiliary (J), in terms of the surface external appearance of the molded article, the amount of the flame retardant auxiliary (J) is preferably not more than 1 part by mass, and more preferably at least 0.1 parts by mass but not more than 1 part by mass, per 100 parts by mass of the resin main component (C).

<Other Components>

Other modifiers, release agents, light or heat stabilizers, antistatic agents, dyes, and pigments and the like may also be added to the reinforced thermoplastic resin composition of the present invention according to need.

<Production Method for Reinforced Thermoplastic Resin Composition>

The reinforced thermoplastic resin composition of the present invention can be obtained by mixing the resin main component (C), the inorganic filler (D), the glycidyl ether unit-containing polymer (E), and the phosphorus-containing modified polyester-based resin (H). If required, flame retardants, the flame retardant auxiliary (J) and other components may also be added to the reinforced thermoplastic resin composition of the present invention.

Specifically, blending of the above components is performed by mixing the components using a mixing device such as a Henschel mixer, tumbler mixer or Nauta mixer. Moreover, kneading may be performed using a kneading device such as a single screw extruder, twin screw extruder, Banbury mixer or co-kneader.

<Actions and Effects>

Because the reinforced thermoplastic resin composition of the present invention described above contains the resin main component (C), the inorganic filler (D), the glycidyl ether unit-containing polymer (E) and the phosphorus-containing modified polyester-based resin (H) in specific proportions, the composition has favorable moldability, and the weld strength, rigidity, impact resistance, mechanical strength, heat resistance and flame retardancy of the obtained molded article can be improved. A molded article for which the weld strength, rigidity, impact resistance, mechanical strength, heat resistance and flame retardancy are all favorable is preferred.

[Molded Article]

The molded article of the present invention is obtained by molding the reinforced thermoplastic resin composition of the present invention.

Examples of the method used for molding the reinforced thermoplastic resin composition include injection molding methods including film and glass insert molding, injection compression molding methods, extrusion methods, blow molding methods, vacuum molding methods, air pressure molding methods, calender molding methods and inflation molding methods. Among these, in terms of offering excellent mass producibility, and enabling molded articles of high dimensional precision to be obtained, injection molding methods and injection compression molding methods are preferred.

The weld strength of the molded article is the power required to generate a crack when a weld within the molded article is pressed with a single point terminal. The test piece is a sheet of A4 size with a thickness of 1 mm. The weld strength of the molded article is preferably at least 120 N, more preferably at least 130 N, and still more preferably 150 N or greater. The weld is formed by providing a plurality of molten resin injection ports in a mold of A4 size, thereby causing confluence of the resin inside the mold. The mold that is used has one molten resin injection port in the center of the mold, two molten resin injection ports in positions 40 mm from the short side and 35 mm from the long side of the A4 rectangular shape, and two molten resin injection ports in positions 40 mm from the short side and 25 mm from the long side of the A4 rectangular shape.

The rigidity of the molded article can be evaluated from the flexural modulus of the molded article measured in accordance with ISO 178. The test piece has thickness, width and length dimensions of 4 mm, 10 mm and 80 mm respectively. The flexural modulus of the molded article is preferably at least 6,500 MPa, more preferably at least 10,000 MPa, and still more preferably 13,000 MPa or greater. The flexural modulus is preferably as high as possible, but is typically not more than 17,000 MPa.

The impact resistance of the molded article can be evaluated from the Charpy impact strength of the molded article measured in accordance with ISO 179. The test piece has thickness, width and length dimensions of 4 mm, 10 mm and 80 mm respectively. The Charpy impact strength of the molded article is preferably at least 10 kJ/m$^2$, more preferably at least 12 kJ/m$^2$, and still more preferably 15 kJ/m$^2$ or greater. The Charpy impact is preferably as high as possible, but is typically not more than 30 kJ/m$^2$.

The mechanical strength of the molded article can be evaluated from the flexural strength of the molded article measured in accordance with ISO 178. The test piece has thickness, width and length dimensions of 4 mm, 10 mm and 80 mm respectively. The flexural strength of the molded article is preferably at least 150 MPa, more preferably at least 180 MPa, and still more preferably 200 MPa or greater. The flexural strength is preferably as high as possible, but is typically not more than 300 MPa.

The heat resistance of the molded article can be evaluated from the temperature of deflection of the molded article, measured by the 1.80 MPa flatwise method in accordance with ISO 75. The temperature of deflection of the molded article is preferably at least 90° C., more preferably at least 100° C., and still more preferably 120° C. or higher. The temperature of deflection is preferably as high as possible, but is typically not more than 150° C.

The flame retardancy of the molded article can be evaluated on the basis of whether or not the article is the equivalent of the V-1 standard in UL94. The test piece has a thickness of 1 mm. The molded article preferably has flame retardancy equivalent to the V-1 standard.

Each of the test pieces used in the measurements described above is prepared by molding the composition using an injection molding machine at a molding temperature of 280 to 320° C.

In other words, one aspect of the present invention is a reinforced thermoplastic resin composition which upon injection molding at a molding temperature of 280 to 320° C. to prepare the test pieces described above, yields test pieces which, when evaluated for each of the properties described above, exhibit the weld strength, rigidity, impact resistance, mechanical strength, heat resistance and flame retardancy properties described above.

The molded article of the present invention can be used in the casings of personal computers including notebooks and tablets, projectors including liquid crystal projectors, televisions, printers, facsimiles, copiers, audio equipment, gaming machines, cameras including video cameras and digital cameras, video equipment, musical instruments, mobile devices such as electronic organizers and portable information terminals (PDA), lighting equipment, and casings of communication equipment including telephones such as mobile phones and smart phones, and also in fishing gear, play equipment such as pachinko articles, vehicle products, furniture products, sanitary products, and construction products and the like. Among these various applications, in terms of making best use of the effects of the present invention, the molded article is particularly suited to use in the casings of mobile equipment such as notebook and tablet type personal computers, and smart phones and the like.

EXAMPLES

A series of examples are described below in detail. However, the present invention is in no way limited by these examples. In the following description, "parts" and "%" mean "parts by mass" and "% by mass" respectively.
<Measurement Methods, Evaluation Methods>
[Acetone-soluble Fraction]
First, 2.5 g of the graft copolymer was immersed in 90 mL of acetone, and following heating at 65° C. for 3 hours, a centrifugal separation was performed at 1,500 rpm for 30 minutes using a centrifuge. Subsequently, the supernatant was removed, the residue was dried in a vacuum dryer at 65° C. for 12 hours, and the dried sample was then weighed. Based on the difference in mass (2.5 g—the dried sample mass (g)), the proportion (%) of the acetone-soluble fraction in the graft copolymer was determined. The reduced viscosity of the acetone-soluble fraction was measured at 25° C. as a 0.2 g/dl N,N-dimethylformamide solution.
[Charpy Impact Strength]
The Charpy impact strength was measured in accordance with ISO 179.
[Flexural Strength and Flexural Modulus]
The flexural strength and the flexural modulus were measured in accordance with ISO 178. The flexural strength is an indicator of the mechanical strength of the molded article, and the flexural modulus is an indicator of the rigidity of the molded article.
[Weld Strength]
A liquid crystal display cover (thickness: 1 mm) for an A4-size notebook personal computer was molded using an injection molding machine (J350E fitted with a 350 t accumulator, manufactured by The Japan Steel Works, Ltd.) under molding conditions including a molding temperature of 290° C., an injection rate of 99%, and a mold temperature of 90° C. The weld in the molded article was pressed with a single point terminal, and the test force (N) when cracking occurred was measured and recorded as the weld strength.
[Heat Resistance]
The temperature of deflection was measured by the flatwise method at a load of 1.80 MPa in accordance with ISO 75.
[Moldability]
A liquid crystal display cover (thickness: 1 mm) for an A4-size notebook personal computer was molded in the same manner as that described for the weld strength. The moldability was evaluated on the basis of the presence or absence of short shots (unfilled portions) during molding, and the presence or absence of shrink marks or gas burns.
OO: no filling faults, shrink marks or gas burns
O: shrink marks were observed on some articles
x: filling faults or gas burns were observed
[Flame Retardancy]
The reinforced thermoplastic resin composition was molded to prepare a test piece (width: 12.7 mm, length: 127 mm, thickness: 1.0 mm), and the flame retardancy was evaluated in accordance with UL94 using the method described below.

The flame from a burner was brought into contact with the bottom end of the vertically clamped test piece for 10 seconds, and the burner flame was then removed from the test piece. One the flame had extinguished, the burner flame was once again brought into contact with the test piece, and the same operation was repeated. Then, based on the afterflame time following completion of the first flame contact, the total of the afterflame time and the afterglow time following the second flame contact, and the presence or absence of burning drips, a judgment was made as to whether or not the test piece was the equivalent of the V-1 standard in UL94, and the flame retardancy was evaluated against the following evaluation criteria. The V-1 standard states that "the first afterflame time exceeds 10 seconds but is not longer than 30 seconds, the total of the second afterflame time and afterglow time exceeds 30 seconds but is not longer than 60 seconds, and no burning drips fall."
O: the test piece had flame retardancy of V-1 level
x: the test piece did not have flame retardancy of V-1 level
<Components>
[Polycarbonate resin (A)]
NOVAREX 7021PJ (viscosity average molecular weight: 18,800) manufactured by Mitsubishi Engineering-Plastics Corporation was used as a polycarbonate resin (A-1).
[Production of Graft Copolymer (B-1)]
A copolymer latex composed of 85% of n-butyl acrylate units and 15% of methacrylic acid units and having an average particle size of 0.08 μm (equivalent to a solid fraction of 2 parts) was added under stirring to a polybutadiene latex having a solid fraction concentration of 35% and an average particle size of 0.08 μm (equivalent to a solid fraction of 100 parts). Stirring was then continued for 30 minutes, thus obtaining an enlarged butadiene-based rubber-like copolymer latex (B1-1) having an average particle size of 0.28 μm.

The thus obtained enlarged butadiene-based rubber-like copolymer (B1-1) latex was placed in a reaction container, and 100 parts of distilled water, 4 parts of a wood rosin emulsifier, 0.4 parts of Demol N (a naphthalenesulfonic acid-formalin condensation product, manufactured by Kao Corporation), 0.04 parts of sodium hydroxide, and 0.7 parts of dextrose were added. The temperature was then raised under continuous stirring, and when the internal temperature reached 60° C., 0.1 part of ferrous sulfate, 0.4 parts of sodium pyrophosphate and 0.06 parts of sodium dithionite were added. Subsequently, a mixture containing the components listed below was added continuously in a dropwise manner over a period of 90 minutes, the reaction conditions were maintained for one hour, and the reaction mixture was then cooled.
acrylonitrile: 30 parts
styrene: 70 parts
cumene hydroperoxide: 0.4 parts
tert-dodecylmercaptan: 1 part
The thus obtained graft copolymer (B-1) latex was coagulated with dilute sulfuric acid, washed, filtered, and dried to obtain a dried powder of the graft copolymer (B-1). The polymerization rate was 98%.

The acetone-soluble fraction of the graft copolymer (B-1) was 27%. Further, the reduced viscosity of the acetone-soluble fraction was 0.3 dl/g.
[Production of Graft Copolymer (B-2)]
A reaction container was charged with raw materials in the proportions shown below, and a polymerization was performed by stirring the mixture under a nitrogen atmosphere at 50° C. for 4 hours, thus obtaining a rubber-like polymer (B1-2) latex. The average particle size was 0.29 μm.

n-butyl acrylate: 98 parts
    1,3-butylene glycol dimethacrylate: 1 part
    allyl methacrylate: 1 part
    sodium dioctyl sulfosuccinate: 2.0 parts
    deionized water: 300 parts
    potassium persulfate: 0.3 parts
    disodium phosphate dodecahydrate: 0.5 parts
    odium hydrogen phosphate dodecahydrate: 0.3 parts The thus obtained rubber-like polymer (B1-2) latex (equivalent to a solid fraction of 100 parts) was placed in a separate reaction container and diluted by adding 280 parts of ion-exchanged water, and the temperature was then raised to 70° C.

In a separate preparation, 0.7 parts of benzoyl peroxide was dissolved in 100 parts of a monomer mixture composed of acrylonitrile/styrene=29/71 (mass ratio), and following nitrogen substitution, the monomer mixture was added to the reaction container containing the aforementioned rubber-like polymer (B1-2) at a rate of 30 parts/hour using a constant rate pump. Following addition of all of the monomer mixture, the temperature inside the reaction container was raised to 80° C., and stirring was continued for a further 30 minutes, thus obtaining a graft copolymer (B-2) latex.

The graft copolymer (B-2) latex was added under stirring to a coagulation tank containing a volume of a 0.15% aqueous solution (90° C.) of aluminum chloride (AlCl3.6H2O) equivalent to three times the volume of the total latex, thereby coagulating the latex. Following addition of all of the latex, the temperature inside the coagulation tank was increased to 93° C., and the mixture was left to stand for 5 minutes. Following cooling, the mixture was dewatered using a centrifuge, and the solid was then washed and dried, yielding a dried powder of the graft copolymer (B-2).

The acetone-soluble fraction of the graft copolymer (B-2) was 21%. Further, the reduced viscosity of the acetone-soluble fraction was 0.70 dl/g.

[Production of Graft Copolymer (B-3)]

A graft copolymer (B-3) using a composite rubber of polybutadiene/poly(butyl acrylate) as a rubber-like polymer (B1-3) was prepared using the method described below.

A copolymer latex composed of 82% n-butyl acrylate units and 18% methacrylic acid units and having an average particle size of 0.10 μm (equivalent to a solid fraction of 0.4 parts) was added under stirring to a polybutadiene latex having a solid fraction concentration of 35% and an average particle size of 0.08 μm (equivalent to a solid fraction of 20 parts). Stirring was continued for a further 30 minutes, thus obtaining an enlarged diene-based rubber latex having an average particle size of 0.36 μm.

The thus obtained enlarged diene-based rubber latex (equivalent to a solid fraction of 20 parts) was placed in a reaction container, 1 part of the potassium salt of disproportionated rosin acid, 150 parts of ion-exchanged water, and a monomer mixture of the composition listed below were added, and following nitrogen substitution, the internal temperature was raised to 50° C.

n-butyl acrylate: 80 parts
    allyl methacrylate: 0.32 parts
    ethylene glycol dimethacrylate: 0.16 parts Subsequently, a solution prepared by dissolving 0.0002 parts of ferrous sulfate, 0.0006 parts of disodium ethylenediaminetetraacetate and 0.25 parts of rongalit in 10 parts of ion-exchanged water was added to the reaction container and reacted. The internal temperature at the completion of the reaction was 75° C. The temperature was then raised to 80° C. and reaction was continued for a further one hour, thus obtaining a rubber-like polymer (B1-3) latex composed of a composite rubber of an enlarged diene-based rubber and a poly(butyl acrylate)-based rubber. The average particle size was 0.32 μm.

The rubber-like polymer (B1-3) latex (equivalent to a solid fraction of 50 parts) was placed in a reaction container and diluted by adding 140 parts of ion-exchanged water, and the temperature was then raised to 70° C.

In a separate preparation, 0.35 parts of benzoyl peroxide was dissolved in 50 parts of a monomer mixture composed of acrylonitrile/styrene=29/71 (mass ratio), and following nitrogen substitution. The monomer mixture was added to the reaction container containing the aforementioned rubber-like polymer (B1-3) latex at a rate of 15 parts/hour using a constant rate pump. Following addition of all of the monomer mixture, the temperature inside the reaction container was raised to 80° C., and stirring was continued for a further 30 minutes, thus obtaining a graft copolymer (B-3) latex.

The graft copolymer (B-3) latex was added under stirring to a coagulation tank containing a volume of a 0.5% aqueous solution of sulfuric acid (90° C.) equivalent to three times the volume of the total latex, thereby coagulating the latex. Following addition of all of the latex, the temperature inside the coagulation tank was increased to 93° C., and the mixture was left to stand for 5 minutes. Following cooling, the mixture was dewatered using a centrifuge, and the solid was then washed and dried, yielding a dried powder of the graft copolymer (B-3).

The acetone-soluble fraction of the graft copolymer (B-3) was 20%. Further, the reduced viscosity of the acetone-soluble fraction was 0.7 dl/g.

[Production of Graft Copolymer (B-4)]

A graft copolymer (B-4) using a composite rubber of polysiloxane/poly(butyl acrylate) as a rubber-like polymer (B1-4) was prepared using the method described below.

First, 96 parts of octamethyltetracyclosiloxane, 2 parts of γ-methacryloxypropyl dimethoxymethylsilane and 2 parts of ethyl orthosilicate were mixed to obtain 100 parts of a siloxane-based mixture. Subsequently, 300 parts of distilled water containing 0.67 parts of dissolved sodium dodecylbenzenesulfonate was added to the mixture and stirred for 2 minutes at 10,000 rpm using a homomixer, and the resulting mixture was then passed once through a homogenizer at a pressure of 30 MPa, thus obtaining a stable premixed organosiloxane latex.

A reaction container fitted with a reagent injection container, a cooling tube, a jacket heater and a stirring device was charged with 2 parts of dodecylbenzenesulfonic acid and 98 parts of distilled water, thus preparing a 2% aqueous solution of dodecylbenzenesulfonic acid. With this aqueous solution heated to 85° C., the premixed organosiloxane latex was added to the reaction container in a dropwise manner over a period of 4 hours, and after completion of the dropwise addition, the temperature was maintained for 1 hour, and then cooled. The reaction liquid was left to stand for 48 hours at room temperature, and was then neutralized using a sodium hydroxide aqueous solution, thereby obtaining a polyorganosiloxane latex (L-1). A portion of the polyorganosiloxane latex (L-1) was dried at 170° C. for 30 minutes, and determination of the solid fraction concentration revealed a value of 17.3%.

A reaction container fitted with a reagent injection container, a cooling tube, a jacket heater and a stirring device was charged with 119.5 parts of the polyorganosiloxane latex (L-1) and 0.8 parts of sodium polyoxyethylene alkyl phenyl ether sulfate, and 203 parts of distilled water was then added and mixed. Subsequently, a mixture composed of 53.2 parts of n-butyl acrylate, 0.21 parts of allyl methacrylate, 0.11 parts of 1,3-butylene glycol dimethacrylate and 0.13 parts of tert-butyl hydroperoxide was added. The reaction container was then flushed with a stream of nitrogen to replace the internal atmosphere with nitrogen, and the temperature was then raised to 60° C. Once the internal temperature of the reaction container had reached 60° C., an aqueous solution containing 0.0001 parts of ferrous sulfate, 0.0003 parts of disodium ethylenediaminetetraacetate and 0.24 parts of rongalit dissolved in 10 parts of distilled water was added, and a radical polymerization was started. The polymerization of the acrylate components resulted in the liquid temperature rising to 78° C. This state was maintained for 1 hour to complete polymerization of the acrylate components, thus obtaining a rubber-like polymer (B1-4) latex composed of a composite rubber of the polyorganosiloxane and butyl acrylate rubber. The volume average particle size was 0.12 μm.

Once the liquid temperature in the reaction container had fallen to 60° C., an aqueous solution containing 0.4 parts of rongalit dissolved in 10 parts of distilled water was added. Next, a mixed liquid containing 11.1 parts of acrylonitrile, 33.2 parts of styrene and 0.2 parts of t-butyl hydroperoxide was added dropwise to the container over a period of 1 hour, and a polymerization was conducted. After completion of the dropwise addition, the reaction mixture was left for 1 hour, and then an aqueous solution containing 0.0002 parts of ferrous sulfate, 0.0006 parts of disodium ethylenediaminetetraacetate and 0.25 parts of rongalit dissolved in 10 parts of distilled water was added. Subsequently, a mixed liquid containing 7.4 parts of acrylonitrile, 22.2 parts of styrene and 0.1 parts of t-butyl hydroperoxide was added in a dropwise manner over a period of 40 minutes to effect a polymerization. After completion of the dropwise addition, the reaction mixture was left for 1 hour, and was then cooled, thus obtaining a latex of a graft copolymer (B-4) in which an acrylonitrile-styrene copolymer had been grafted to the composite rubber of the polyorganosiloxane and butyl acrylate rubber (the rubber-like polymer (B1-4)).

Subsequently, 150 parts of an aqueous solution containing 5% of dissolved calcium acetate was heated to 60° C. under stirring, and 100 parts of the latex of the graft copolymer (B-4) was then added gradually in a dropwise manner to this aqueous solution of calcium acetate, thereby coagulating the graft copolymer. The thus obtained coagulated product was separated, washed and dried, thus obtaining a dried powder of the graft copolymer (B-4).

The acetone-soluble fraction of the graft copolymer (B-4) was 26%. Further, the reduced viscosity of the acetone-soluble fraction was 0.60 dl/g.

[Inorganic Filler (D)]

Chopped carbon fibers (TR06U manufactured by Mitsubishi Rayon Co., Ltd., surface treatment agent: polyurethane, major axis/minor axis ratio: 1/1) were used as an inorganic filler (D-1).

Chopped glass fibers (CSG 3PA-820 manufactured by Nitto Boseki Co., Ltd., surface treatment agent: polyurethane, major axis/minor axis ratio: 4) were used as an inorganic filler (D-2).

Chopped glass fibers (CSH 3PA-870 manufactured by Nitto Boseki Co., Ltd., surface treatment agent: polyurethane, major axis/minor axis ratio: 2) were used as an inorganic filler (D-3).

Chopped glass fibers (CSH 3PA-850 manufactured by Nitto Boseki Co., Ltd., surface treatment agent: epoxy resin, major axis/minor axis ratio: 2) were used as an inorganic filler (D-4).

Chopped glass fibers (CSH 3PE-455 manufactured by Nitto Boseki Co., Ltd., surface treatment agent: polyurethane, major axis/minor axis ratio: 1) were used as an inorganic filler (D-5).

[Glycidyl Ether Unit-containing Polymer (E)]

An epoxy group-containing phenoxy resin (jER4250 manufactured by Mitsubishi Chemical Corporation, weight average molecular weight: 60,000) was used as a glycidyl ether unit-containing polymer (E-1).

An epoxy group-containing phenoxy resin (jER1256 manufactured by Mitsubishi Chemical Corporation, weight average molecular weight: 50,000) was used as a glycidyl ether unit-containing polymer (E-2).

A bisphenol A type epoxy resin (jER1010 manufactured by Mitsubishi Chemical Corporation, weight average molecular weight: 5,500) was used as a glycidyl ether unit-containing polymer (E-3).

A bisphenol A type epoxy resin (jER1009 manufactured by Mitsubishi Chemical Corporation, weight average molecular weight: 3,800) was used as a glycidyl ether unit-containing polymer (E-4).

A bisphenol A type epoxy resin (jER1004 manufactured by Mitsubishi Chemical Corporation, weight average molecular weight: 1,650) was used as a glycidyl ether unit-containing polymer (E-5).

[Production of Glycidyl Ether Unit-containing Polymer (E-6)]

A 500 mL separable flask fitted with a stirrer, a thermometer, a nitrogen inlet and a condenser was charged with 82.42 parts of a bisphenol A type epoxy resin (epoxy equivalent weight: 467 g/eq), 6.3 parts of a bisphenol A type liquid epoxy resin (epoxy equivalent weight: 210 g/eq, hydrolyzable chlorine: 1.79%), 13.95 parts of bisphenol A, 19.6 parts of p-cumylphenol, 7.5 parts of a polyester resin (GV-335 manufactured by Japan U-pica Co., Ltd., acid value: 30 KOHmg/g) and 30 parts of xylene, and the temperature was then raised by heating under a nitrogen atmosphere.

When the internal temperature of the reaction system reached 80° C., 0.18 parts of a 5% aqueous solution of lithium chloride was added, and the temperature was then raised further. When the internal temperature of the reaction system reached 130° C., the pressure inside the reaction system was reduced, and the xylene and water were extracted from the system. Reaction was continued with the reaction temperature maintained at 160° C., and after one hour, nitrogen was introduced into the reaction system to return the internal pressure of the reaction system to normal pressure. Seven hours after the reaction temperature first reached 160° C., 20.25 parts of a high-molecular weight bisphenol A type epoxy resin (epoxy equivalent weight: 2,700 g/eq) was added, and after stirring for one hour, 100 parts of a polyester resin (GV-730 manufactured by Japan U-pica Co., Ltd., acid value: 3 KOHmg/g) was added, and reaction was continued at 180° C. for 10 hours, thus obtaining a high-molecular weight epoxy resin. When an attempt was made to dissolve a 0.1 g sample of the thus obtained high-molecular weight epoxy resin in 10 mL of tetrahydrofuran in order to subject the resin to molecular weight measurement by GPC, about 0.05 g was insoluble. Following filtering through a 5C filter paper, the filtrate was subjected to a molecular weight measurement by GPC, and revealed a weight average molecular weight of 70,200.

[Production of Phosphorus-containing Modified Polyester-based Resin (H-1)]

One hundred parts of VYLON GH250 (manufactured by Toyobo Co., Ltd., phosphorus atom content: 5%, intrinsic viscosity: 0.52 dl/g) as an unmodified polyester-based resin (F-1) containing phosphorus atoms, and 0.5 parts of CARBODILITE HMV-8CA (manufactured by Nisshinbo Chemical Inc.) as a polycarbodiimide compound (G-1) were kneaded using a twin screw extruder, thus obtaining a phosphorus-containing modified polyester-based resin (H-1) in which the polyester-based resin (F-1) had been modified with the polycarbodiimide compound (G-1).

[Production of Phosphorus-containing Modified Polyester-based Resin (H-2)]

One hundred parts of VYLON GH230 (manufactured by Toyobo Co., Ltd., phosphorus atom content: 3%) as an unmodified polyester-based resin (F-2) containing phosphorus atoms, and 0.5 parts of CARBODILITE HMV-8CA (manufactured by Nisshinbo Chemical Inc.) as the polycarbodiimide compound (G-1) were kneaded using a twin screw extruder, thus obtaining a phosphorus-containing modified polyester-based resin (H-2) in which the polyester-based resin (F-2) had been modified with the polycarbodiimide compound (G-1).

[Production of Phosphorus-free Modified Polyester-based Resin (H-3)]

One hundred parts of NOVAPEX GM502S (manufactured by Mitsubishi Chemical Corporation, phosphorus atom content: 0%) as an unmodified polyester-based resin (F-3) containing no phosphorus atoms, and 0.5 parts of CARBODILITE HMV-8CA (manufactured by Nisshinbo Chemical Inc.) as the polycarbodiimide compound (G-1) were kneaded using a twin screw extruder, thus obtaining a phosphorus-free modified polyester-based resin (H-3) in which the polyester-based resin (F-3) had been modified with the polycarbodiimide compound (G-1).

[Production of Phosphorus-containing Unmodified Polyester-based Resin (H-4)]

The unmodified polyester-based resin (F-1) containing phosphorus atoms (VYLON GH250, manufactured by Toyobo Co., Ltd., phosphorus atom content: 5%, intrinsic viscosity: 0.52 dl/g) was used as a phosphorus-containing unmodified polyester-based resin (H-4).

[Phosphate Ester-based Flame Retardant (I)]

Bisphenol A bis(diphenyl phosphate) (BAPP, manufactured by Ajinomoto Fine-Techno Co., Inc., weight average molecular weight: 692 (catalog value)) was used as a phosphate ester-based flame retardant (I-1).

Phenylenebis(dixylyl phosphate) (PX-200, manufactured by Daihachi Chemical Industry Co., Ltd., weight average molecular weight: 686 (catalog value)) was used as a phosphate ester-based flame retardant (I-2).

Phenylenebis(diphenyl phosphate) (CR-733S, manufactured by Daihachi Chemical Industry Co., Ltd., weight average molecular weight: 574 (catalog value)) was used as a phosphate ester-based flame retardant (I-3).

Triphenyl phosphate (TPP, manufactured by Daihachi Chemical Industry Co., Ltd., weight average molecular weight: 326 (catalog value)) was used as a phosphate ester-based flame retardant (I-4).

[Flame Retardant Auxiliary (J)]

Polytetrafluoroethylene (PTFE) was used as a flame retardant auxiliary (J-1).

Examples 1 to 30, Comparative Examples 1 to 11

The components described above were blended in the proportions shown in Tables 1 to 6 and kneaded using a twin screw extruder, yielding pellets of a series of reinforced thermoplastic resin compositions. The thus obtained pellets were dried at 100° C. for 3 hours, and the moldability was then evaluated by injection molding. Further, the Charpy impact strength, flexural strength, flexural modulus, weld strength, heat resistance and flame retardancy were measured for each of the obtained molded articles. The evaluation results are shown in Tables 1 to 6.

TABLE 1

| | | | | Example 1 | Example 2 | Example 3 | Example 4 | Example 5 | Example 6 | Example 7 |
|---|---|---|---|---|---|---|---|---|---|---|
| Reinforced thermoplastic resin composition | C | A [%] | A-1 | 80 | 90 | 90 | 100 | 95 | 95 | 95 |
| | | B [%] | B-1 | 0 | 0 | 0 | 0 | 0 | 0 | 0 |
| | | | B-2 | 0 | 0 | 0 | 0 | 0 | 0 | 0 |
| | | | B-3 | 0 | 0 | 0 | 0 | 0 | 0 | 0 |
| | | | B-4 | 20 | 10 | 10 | 0 | 5 | 5 | 5 |
| | D [parts] | | D-1 | 0 | 0 | 0 | 0 | 34.2 | 0 | 0 |
| | | | D-2 | 28.5 | 28.5 | 28.7 | 111.9 | 0 | 34.2 | 58.6 |
| | | | D-3 | 0 | 0 | 0 | 0 | 0 | 0 | 0 |
| | | | D-4 | 0 | 0 | 0 | 0 | 0 | 0 | 0 |
| | | | D-5 | 0 | 0 | 0 | 0 | 0 | 0 | 0 |
| | E [parts] | | E-1 | 0 | 0 | 0 | 0 | 0 | 0 | 0 |
| | | | E-2 | 8 | 8 | 8 | 8 | 8 | 8 | 8 |
| | | | E-3 | 0 | 0 | 0 | 0 | 0 | 0 | 0 |
| | | | E-4 | 0 | 0 | 0 | 0 | 0 | 0 | 0 |
| | | | E-5 | 0 | 0 | 0 | 0 | 0 | 0 | 0 |
| | | | E-6 | 0 | 0 | 0 | 0 | 0 | 0 | 0 |
| | H [parts] | | H-1 | 5 | 5 | 5 | 5 | 5 | 5 | 5 |
| | | | H-2 | 0 | 0 | 0 | 0 | 0 | 0 | 0 |
| | | | H-3 | 0 | 0 | 0 | 0 | 0 | 0 | 0 |
| | | | H-4 | 0 | 0 | 0 | 0 | 0 | 0 | 0 |
| | I [parts] | | I-1 | 0 | 0 | 0 | 0 | 0 | 0 | 0 |
| | | | I-2 | 0 | 0 | 1 | 23 | 23 | 23 | 23 |
| | | | I-3 | 0 | 0 | 0 | 0 | 0 | 0 | 0 |
| | | | I-4 | 0 | 0 | 0 | 0 | 0 | 0 | 0 |
| | J [parts] | | J-1 | 0.8 | 0.8 | 0.8 | 0.8 | 0.8 | 0.8 | 0.8 |
| | C proportion [%] | | | 70 | 70 | 70 | 40 | 58 | 58 | 51 |
| | D proportion [%] | | | 20 | 20 | 20 | 45 | 20 | 20 | 30 |

TABLE 1-continued

|  |  | Example 1 | Example 2 | Example 3 | Example 4 | Example 5 | Example 6 | Example 7 |
|---|---|---|---|---|---|---|---|---|
| Evaluations | Charpy impact strength [kJ/m$^2$] | 12 | 13 | 13 | 16 | 12 | 12 | 15 |
|  | Flexural strength [MPa] | 157 | 165 | 168 | 265 | 251 | 182 | 230 |
|  | Flexural modulus [MPa] | 6700 | 7000 | 7200 | 15000 | 14700 | 7700 | 11600 |
|  | Weld strength [N] | 137 | 139 | 139 | 183 | 160 | 153 | 165 |
|  | Temperature of deflection [° C.] | 130 | 140 | 138 | 99 | 91 | 91 | 95 |
|  | Moldability | ∘∘ | ∘∘ | ∘∘ | ∘ | ∘∘ | ∘∘ | ∘∘ |
|  | Flame retardancy | ∘ | ∘ | ∘ | ∘ | ∘ | ∘ | ∘ |

TABLE 2

|  |  |  |  | Example 8 | Example 9 | Example 10 | Example 11 | Example 12 | Example 13 | Example 14 |
|---|---|---|---|---|---|---|---|---|---|---|
| Reinforced thermoplastic resin composition | C | A [%] | A-1 | 95 | 95 | 95 | 95 | 95 | 95 | 95 |
|  |  | B [%] | B-1 | 0 | 0 | 0 | 0 | 0 | 5 | 0 |
|  |  |  | B-2 | 0 | 0 | 0 | 0 | 0 | 0 | 5 |
|  |  |  | B-3 | 0 | 0 | 0 | 0 | 0 | 0 | 0 |
|  |  |  | B-4 | 5 | 5 | 5 | 5 | 5 | 0 | 0 |
|  | D [parts] |  | D-1 | 0 | 0 | 0 | 0 | 0 | 0 | 0 |
|  |  |  | D-2 | 111.9 | 136.8 | 0 | 0 | 0 | 111.9 | 111.9 |
|  |  |  | D-3 | 0 | 0 | 111.9 | 0 | 0 | 0 | 0 |
|  |  |  | D-4 | 0 | 0 | 0 | 111.9 | 0 | 0 | 0 |
|  |  |  | D-5 | 0 | 0 | 0 | 0 | 111.9 | 0 | 0 |
|  | E [parts] |  | E-1 | 0 | 0 | 0 | 0 | 0 | 0 | 0 |
|  |  |  | E-2 | 8 | 8 | 8 | 8 | 8 | 8 | 8 |
|  |  |  | E-3 | 0 | 0 | 0 | 0 | 0 | 0 | 0 |
|  |  |  | E-4 | 0 | 0 | 0 | 0 | 0 | 0 | 0 |
|  |  |  | E-5 | 0 | 0 | 0 | 0 | 0 | 0 | 0 |
|  |  |  | E-6 | 0 | 0 | 0 | 0 | 0 | 0 | 0 |
|  | H [parts] |  | H-1 | 5 | 5 | 5 | 5 | 5 | 5 | 5 |
|  |  |  | H-2 | 0 | 0 | 0 | 0 | 0 | 0 | 0 |
|  |  |  | H-3 | 0 | 0 | 0 | 0 | 0 | 0 | 0 |
|  |  |  | H-4 | 0 | 0 | 0 | 0 | 0 | 0 | 0 |
|  | I [parts] |  | I-1 | 0 | 0 | 0 | 0 | 0 | 0 | 0 |
|  |  |  | I-2 | 23 | 23 | 23 | 23 | 23 | 23 | 23 |
|  |  |  | I-3 | 0 | 0 | 0 | 0 | 0 | 0 | 0 |
|  |  |  | I-4 | 0 | 0 | 0 | 0 | 0 | 0 | 0 |
|  | J [parts] |  | J-1 | 0.8 | 0.8 | 0.8 | 0.8 | 0.8 | 0.8 | 0.8 |
|  | C proportion [%] |  |  | 40 | 37 | 40 | 40 | 40 | 40 | 40 |
|  | D proportion [%] |  |  | 45 | 50 | 45 | 45 | 45 | 45 | 45 |
| Evaluations | Charpy impact strength [kJ/m$^2$] |  |  | 19 | 18 | 14 | 12 | 10 | 18 | 18 |
|  | Flexural strength [MPa] |  |  | 261 | 276 | 250 | 228 | 214 | 253 | 258 |
|  | Flexural modulus [MPa] |  |  | 15100 | 16200 | 14800 | 14600 | 14300 | 15100 | 15000 |
|  | Weld strength [N] |  |  | 181 | 186 | 170 | 156 | 149 | 175 | 180 |
|  | Temperature of deflection [° C.] |  |  | 97 | 97 | 97 | 97 | 96 | 97 | 96 |
|  | Moldability |  |  | ∘∘ | ∘ | ∘∘ | ∘∘ | ∘∘ | ∘∘ | ∘∘ |
|  | Flame retardancy |  |  | ∘ | ∘ | ∘ | ∘ | ∘ | ∘ | ∘ |

TABLE 3

|  |  |  |  | Example 15 | Example 16 | Example 17 | Example 18 | Example 19 | Example 20 | Example 21 |
|---|---|---|---|---|---|---|---|---|---|---|
| Reinforced thermoplastic resin composition | C | A [%] | A-1 | 95 | 95 | 95 | 95 | 95 | 95 | 95 |
|  |  | B [%] | B-1 | 0 | 0 | 0 | 0 | 0 | 0 | 0 |
|  |  |  | B-2 | 0 | 0 | 0 | 0 | 0 | 0 | 0 |
|  |  |  | B-3 | 5 | 0 | 0 | 0 | 0 | 0 | 0 |
|  |  |  | B-4 | 0 | 5 | 5 | 5 | 5 | 5 | 5 |
|  | D [parts] |  | D-1 | 0 | 0 | 0 | 0 | 0 | 0 | 0 |
|  |  |  | D-2 | 111.9 | 106.2 | 107.8 | 113.6 | 93.9 | 95.6 | 113.6 |
|  |  |  | D-3 | 0 | 0 | 0 | 0 | 0 | 0 | 0 |
|  |  |  | D-4 | 0 | 0 | 0 | 0 | 0 | 0 | 0 |
|  |  |  | D-5 | 0 | 0 | 0 | 0 | 0 | 0 | 0 |
|  | E [parts] |  | E-1 | 0 | 0 | 0 | 0 | 0 | 0 | 0 |
|  |  |  | E-2 | 8 | 1 | 3 | 10 | 8 | 8 | 8 |
|  |  |  | E-3 | 0 | 0 | 0 | 0 | 0 | 0 | 0 |
|  |  |  | E-4 | 0 | 0 | 0 | 0 | 0 | 0 | 0 |
|  |  |  | E-5 | 0 | 0 | 0 | 0 | 0 | 0 | 0 |
|  |  |  | E-6 | 0 | 0 | 0 | 0 | 0 | 0 | 0 |
|  | H [parts] |  | H-1 | 5 | 5 | 5 | 5 | 5 | 5 | 5 |
|  |  |  | H-2 | 0 | 0 | 0 | 0 | 0 | 0 | 0 |
|  |  |  | H-3 | 0 | 0 | 0 | 0 | 0 | 0 | 0 |
|  |  |  | H-4 | 0 | 0 | 0 | 0 | 0 | 0 | 0 |

TABLE 3-continued

|  |  |  |  | Example 15 | Example 16 | Example 17 | Example 18 | Example 19 | Example 20 | Example 21 |
|---|---|---|---|---|---|---|---|---|---|---|
|  |  | I [parts] | I-1 | 0 | 0 | 0 | 0 | 0 | 0 | 0 |
|  |  |  | I-2 | 23 | 23 | 23 | 23 | 1 | 3 | 25 |
|  |  |  | I-3 | 0 | 0 | 0 | 0 | 0 | 0 | 0 |
|  |  |  | I-4 | 0 | 0 | 0 | 0 | 0 | 0 | 0 |
|  |  | J [parts] | J-1 | 0.8 | 0.8 | 0.8 | 0.8 | 0.8 | 0.8 | 0.8 |
|  |  | C proportion [%] |  | 40 | 42 | 42 | 40 | 48 | 47 | 40 |
|  |  | D proportion [%] |  | 45 | 45 | 45 | 45 | 45 | 45 | 45 |
| Evaluations |  | Charpy impact strength [kJ/m$^2$] |  | 18 | 11 | 13 | 19 | 23 | 22 | 18 |
|  |  | Flexural strength [MPa] |  | 263 | 182 | 189 | 263 | 183 | 187 | 263 |
|  |  | Flexural modulus [MPa] |  | 15000 | 14700 | 14800 | 15200 | 11200 | 11400 | 15300 |
|  |  | Weld strength [N] |  | 182 | 133 | 145 | 184 | 195 | 192 | 180 |
|  |  | Temperature of deflection [° C.] |  | 97 | 97 | 97 | 98 | 127 | 123 | 94 |
|  |  | Moldability |  | ⊚ | ⊚ | ⊚ | ○ | ○ | ⊚ | ⊚ |
|  |  | Flame retardancy |  | ○ | ○ | ○ | ○ | ○ | ○ | ○ |

TABLE 4

|  |  |  |  | Example 22 | Example 23 | Example 24 | Example 25 | Example 26 | Example 27 | Example 28 |
|---|---|---|---|---|---|---|---|---|---|---|
| Reinforced thermoplastic resin composition | C | A [%] | A-1 | 95 | 95 | 95 | 95 | 95 | 95 | 95 |
|  |  | B [%] | B-1 | 0 | 0 | 0 | 0 | 0 | 0 | 0 |
|  |  |  | B-2 | 0 | 0 | 0 | 0 | 0 | 0 | 0 |
|  |  |  | B-3 | 0 | 0 | 0 | 0 | 0 | 0 | 0 |
|  |  |  | B-4 | 5 | 5 | 5 | 5 | 5 | 5 | 5 |
|  | D [parts] |  | D-1 | 0 | 0 | 0 | 0 | 0 | 0 | 0 |
|  |  |  | D-2 | 111.9 | 111.9 | 111.9 | 108.7 | 116 | 116 | 110.3 |
|  |  |  | D-3 | 0 | 0 | 0 | 0 | 0 | 0 | 0 |
|  |  |  | D-4 | 0 | 0 | 0 | 0 | 0 | 0 | 0 |
|  |  |  | D-5 | 0 | 0 | 0 | 0 | 0 | 0 | 0 |
|  | E [parts] |  | E-1 | 0 | 0 | 0 | 0 | 0 | 0 | 8 |
|  |  |  | E-2 | 8 | 8 | 8 | 8 | 8 | 8 | 0 |
|  |  |  | E-3 | 0 | 0 | 0 | 0 | 0 | 0 | 0 |
|  |  |  | E-4 | 0 | 0 | 0 | 0 | 0 | 0 | 0 |
|  |  |  | E-5 | 0 | 0 | 0 | 0 | 0 | 0 | 0 |
|  |  |  | E-6 | 0 | 0 | 0 | 0 | 0 | 0 | 0 |
|  | H [parts] |  | H-1 | 5 | 5 | 5 | 3 | 8 | 10 | 5 |
|  |  |  | H-2 | 0 | 0 | 0 | 0 | 0 | 0 | 0 |
|  |  |  | H-3 | 0 | 0 | 0 | 0 | 0 | 0 | 0 |
|  |  |  | H-4 | 0 | 0 | 0 | 0 | 0 | 0 | 0 |
|  | I [parts] |  | I-1 | 23 | 0 | 0 | 0 | 0 | 0 | 0 |
|  |  |  | I-2 | 0 | 0 | 0 | 23 | 23 | 23 | 23 |
|  |  |  | I-3 | 0 | 23 | 0 | 0 | 0 | 0 | 0 |
|  |  |  | I-4 | 0 | 0 | 23 | 0 | 0 | 0 | 0 |
|  | J [parts] |  | J-1 | 0.8 | 0.8 | 0.8 | 0.8 | 0.8 | 0.8 | 0.8 |
|  | C proportion [%] |  |  | 40 | 40 | 40 | 41 | 39 | 39 | 40 |
|  | D proportion [%] |  |  | 45 | 45 | 45 | 45 | 45 | 45 | 45 |
| Evaluations | Charpy impact strength [kJ/m$^2$] |  |  | 18 | 19 | 19 | 16 | 16 | 16 | 19 |
|  | Flexural strength [MPa] |  |  | 256 | 258 | 259 | 235 | 252 | 249 | 271 |
|  | Flexural modulus [MPa] |  |  | 14900 | 14900 | 14900 | 13700 | 14500 | 14000 | 15000 |
|  | Weld strength [N] |  |  | 181 | 180 | 179 | 171 | 178 | 172 | 179 |
|  | Temperature of deflection [° C.] |  |  | 97 | 96 | 94 | 97 | 97 | 97 | 97 |
|  | Moldability |  |  | ⊚ | ⊚ | ○ | ⊚ | ⊚ | ⊚ | ⊚ |
|  | Flame retardancy |  |  | ○ | ○ | ○ | ○ | ○ | ○ | ○ |

TABLE 5

|  |  |  |  | Example 29 | Example 30 | Comparative Example 1 | Comparative Example 2 | Comparative Example 3 | Comparative Example 4 | Comparative Example 5 |
|---|---|---|---|---|---|---|---|---|---|---|
| Reinforced thermoplastic resin composition | C | A [%] | A-1 | 95 | 95 | 75 | 100 | 95 | 95 | 95 |
|  |  | B [%] | B-1 | 0 | 0 | 0 | 0 | 0 | 0 | 0 |
|  |  |  | B-2 | 0 | 0 | 0 | 0 | 0 | 0 | 0 |
|  |  |  | B-3 | 0 | 0 | 0 | 0 | 0 | 0 | 0 |
|  |  |  | B-4 | 5 | 5 | 25 | 0 | 5 | 5 | 5 |
|  | D [parts] |  | D-1 | 0 | 0 | 0 | 0 | 0 | 0 | 0 |
|  |  |  | D-2 | 110.3 | 110.3 | 0 | 164.8 | 103.7 | 107.8 | 140.8 |
|  |  |  | D-3 | 0 | 0 | 0 | 0 | 0 | 0 | 0 |
|  |  |  | D-4 | 0 | 0 | 0 | 0 | 0 | 0 | 0 |
|  |  |  | D-5 | 0 | 0 | 27.9 | 0 | 0 | 0 | 0 |

TABLE 5-continued

| | | | Example 29 | Example 30 | Comparative Example 1 | Comparative Example 2 | Comparative Example 3 | Comparative Example 4 | Comparative Example 5 |
|---|---|---|---|---|---|---|---|---|---|
| | E [parts] | E-1 | 0 | 0 | 0 | 0 | 0 | 0 | 0 |
| | | E-2 | 0 | 0 | 8 | 8 | 0 | 8 | 0 |
| | | E-3 | 8 | 0 | 0 | 0 | 0 | 0 | 0 |
| | | E-4 | 0 | 8 | 0 | 0 | 0 | 0 | 0 |
| | | E-5 | 0 | 0 | 0 | 0 | 0 | 0 | 0 |
| | | E-6 | 0 | 0 | 0 | 0 | 0 | 0 | 12 |
| | H [parts] | H-1 | 5 | 5 | 5 | 5 | 5 | 0 | 5 |
| | | H-2 | 0 | 0 | 0 | 0 | 0 | 0 | 0 |
| | | H-3 | 0 | 0 | 0 | 0 | 0 | 0 | 0 |
| | | H-4 | 0 | 0 | 0 | 0 | 0 | 0 | 0 |
| | I [parts] | I-1 | 0 | 0 | 0 | 0 | 0 | 0 | 0 |
| | | I-2 | 23 | 23 | 0 | 23 | 23 | 23 | 23 |
| | | I-3 | 0 | 0 | 0 | 0 | 0 | 0 | 0 |
| | | I-4 | 0 | 0 | 0 | 0 | 0 | 0 | 0 |
| | J [parts] | J-1 | 0.8 | 0.8 | 0.8 | 0.8 | 0.8 | 0.8 | 0.8 |
| | C proportion [%] | | 40 | 40 | 71 | 33 | 43 | 42 | 36 |
| | D proportion [%] | | 45 | 45 | 20 | 55 | 45 | 45 | 50 |
| Evaluations | Charpy impact strength [kJ/m$^2$] | | 19 | 19 | 11 | 16 | 9 | 19 | 19 |
| | Flexural strength [MPa] | | 268 | 268 | 147 | 272 | 198 | 255 | 277 |
| | Flexural modulus [MPa] | | 14900 | 14900 | 6300 | 16600 | 14500 | 14600 | 15600 |
| | Weld strength [N] | | 181 | 178 | 133 | 192 | 117 | 99 | 190 |
| | Temperature of deflection [° C.] | | 97 | 97 | 125 | 98 | 97 | 99 | 98 |
| | Moldability | | ∘∘ | ∘∘ | ∘∘ | x | ∘∘ | ∘∘ | x |
| | Flame retardancy | | ∘ | ∘ | x | ∘ | ∘ | ∘ | x |

TABLE 6

| | | | | Comparative Example 6 | Comparative Example 7 | Comparative Example 8 | Comparative Example 9 | Comparative Example 10 | Comparative Example 11 |
|---|---|---|---|---|---|---|---|---|---|
| Reinforced thermoplastic resin composition | C | A [%] | A-1 | 95 | 95 | 95 | 95 | 95 | 95 |
| | | B [%] | B-1 | 0 | 0 | 0 | 0 | 0 | 0 |
| | | | B-2 | 0 | 0 | 0 | 0 | 0 | 0 |
| | | | B-3 | 0 | 0 | 0 | 0 | 0 | 0 |
| | | | B-4 | 5 | 5 | 5 | 5 | 5 | 5 |
| | D [parts] | | D-1 | 0 | 0 | 0 | 0 | 0 | 0 |
| | | | D-2 | 117.7 | 111.9 | 108.7 | 111.9 | 111.9 | 111.9 |
| | | | D-3 | 0 | 0 | 0 | 0 | 0 | 0 |
| | | | D-4 | 0 | 0 | 0 | 0 | 0 | 0 |
| | | | D-5 | 0 | 0 | 0 | 0 | 0 | 0 |
| | E [parts] | | E-1 | 0 | 0 | 0 | 0 | 0 | 0 |
| | | | E-2 | 8 | 0 | 8 | 8 | 8 | 8 |
| | | | E-3 | 0 | 0 | 0 | 0 | 0 | 0 |
| | | | E-4 | 0 | 0 | 0 | 0 | 0 | 0 |
| | | | E-5 | 0 | 8 | 0 | 0 | 0 | 0 |
| | | | E-6 | 0 | 0 | 0 | 0 | 0 | 0 |
| | H [parts] | | H-1 | 12 | 5 | 1 | 0 | 0 | 0 |
| | | | H-2 | 0 | 0 | 0 | 5 | 0 | 0 |
| | | | H-3 | 0 | 0 | 0 | 0 | 5 | 0 |
| | | | H-4 | 0 | 0 | 0 | 0 | 0 | 5 |
| | I [parts] | | I-1 | 0 | 0 | 0 | 0 | 0 | 0 |
| | | | I-2 | 23 | 23 | 23 | 23 | 23 | 23 |
| | | | I-3 | 0 | 0 | 0 | 0 | 0 | 0 |
| | | | I-4 | 0 | 0 | 0 | 0 | 0 | 0 |
| | J [parts] | | J-1 | 0.8 | 0.8 | 0.8 | 0.8 | 0.8 | 0.8 |
| | C proportion [%] | | | 38 | 40 | 41 | 40 | 40 | 40 |
| | D proportion [%] | | | 45 | 45 | 45 | 45 | 45 | 45 |
| Evaluations | Charpy impact strength [kJ/m$^2$] | | | 16 | 8 | 18 | 17 | 20 | 16 |
| | Flexural strength [MPa] | | | 263 | 253 | 247 | 252 | 249 | 256 |
| | Flexural modulus [MPa] | | | 14700 | 14800 | 14700 | 14700 | 14400 | 14800 |
| | Weld strength [N] | | | 102 | 170 | 100 | 182 | 182 | 99 |
| | Temperature of deflection [° C.] | | | 98 | 97 | 97 | 97 | 97 | 97 |
| | Moldability | | | ∘∘ | ∘∘ | ∘∘ | ∘∘ | ∘∘ | ∘∘ |
| | Flame retardancy | | | x | ∘ | ∘ | x | x | ∘ |

The amounts of the inorganic fillers (D), the glycidyl ether unit-containing polymers (E), the phosphorus-containing modified polyester-based resins (H) and substitutes therefor, the phosphate ester-based flame retardants (I) and the flame retardant auxiliary (J) shown in Tables 1 to 6 represent amounts (parts) per 100 parts of the resin main component (C). Further, the "C proportion" and the "D proportion" represent the proportion (%) of the resin main component (C) and the inorganic filler (D) respectively, relative to 100% of the reinforced thermoplastic resin composition.

As shown in Tables 1 to 6, the reinforced thermoplastic resin composition obtained in each of the Examples exhibited excellent moldability. Further, a molded article having excellent weld strength, rigidity, impact resistance, mechanical strength, heat resistance and flame retardancy was able to be obtained from the reinforced thermoplastic resin composition obtained in each Example.

In contrast, in the case of Comparative Examples 1 to 11, at least one of the moldability of the reinforced thermoplastic resin composition, or the weld strength, rigidity, impact resistance, mechanical strength or flame retardancy of the molded article was inferior.

Specifically, in the case of Comparative Example 1, in which the proportion of the polycarbonate resin (A) was small and the proportion of the graft copolymer (B) was large, the rigidity, mechanical strength and flame retardancy were inferior.

In the case of Comparative Example 2, in which the proportion of the inorganic filler (D) was large, the moldability was inferior.

In the case of Comparative Example 3, which contained no glycidyl ether unit-containing polymer (E), the impact resistance and the weld strength were inferior.

In the case of Comparative Example 4, which contained no phosphorus-containing modified polyester-based resin (H), the weld strength was inferior.

In the case of Comparative Example 5, in which the glycidyl ether unit-containing polymer (E) had a weight average molecular weight of 70,200, and was included in an amount of 12 parts per 100 parts of the resin main component (C), the moldability and the flame retardancy were inferior.

In the case of Comparative Example 6, in which the proportion of the phosphorus-containing modified polyester-based resin (H) was large, the weld strength and the flame retardancy were inferior.

In the case of Comparative Example 7, in which the weight average molecular weight of the glycidyl ether unit-containing polymer (E) was 1,650, the impact resistance was inferior.

In the case of Comparative Example 8, in which the proportion of the phosphorus-containing modified polyester-based resin (H) was small, the weld strength was inferior.

In the case of Comparative Examples 9 and 10, in which the phosphorus atom content of the polyester-based resin (F) was less than 4% by mass, the flame retardancy was inferior.

In the case of Comparative Example 11, in which the polyester-based resin (F) containing phosphorus atoms was not modified, the weld strength was inferior.

Further, based on a comparison of Example 8 and Comparative Example 3 it is evident that the reinforced thermoplastic resin composition of the present invention yields a molded article with superior impact resistance and weld strength to that of a molded article obtained from a reinforced thermoplastic resin composition which does not contain the glycidyl ether unit-containing polymer (E).

Based on a comparison of Example 8 and Comparative Example 4 it is evident that the reinforced thermoplastic resin composition of the present invention yields a molded article with superior weld strength to that of a molded article obtained from a reinforced thermoplastic resin composition which does not contain the phosphorus-containing modified polyester-based resin (H).

Based on a comparison of Example 8 with Comparative Examples 9 and 10 it is evident that the reinforced thermoplastic resin composition of the present invention yields a molded article with superior flame retardancy to that of a molded article obtained from either a reinforced thermoplastic resin composition containing the phosphorus-containing modified polyester-based resin (H-2) in which a polyester-based resin (F) having a phosphorus atom content of less than 4% by mass was modified, or a reinforced thermoplastic resin composition containing the phosphorus-free modified polyester-based resin (H-3).

Based on a comparison of Example 8 and Comparative Example 11 it is evident that the reinforced thermoplastic resin composition of the present invention yields a molded article with superior weld strength to that of a molded article obtained from a reinforced thermoplastic resin composition containing the phosphorus-containing unmodified polyester-based resin (H-4) in which a polyester-based resin (F) having a phosphorus atom content of at least 4% by mass was not modified.

INDUSTRIAL APPLICABILITY

The reinforced thermoplastic resin composition of the present invention is particularly useful as a material for the casings of mobile equipment (such as notebook and tablet type personal computers, mobile phones including smart phones, digital cameras, and digital video cameras).

What is claimed is:
1. A reinforced thermoplastic resin composition comprising:
a resin main component (C), either composed of a polycarbonate resin (A), or composed of a polycarbonate resin (A) and a graft copolymer (B),
an inorganic filler (D),
a glycidyl ether unit-containing polymer (E) having a glycidyl ether unit and having a weight-average molecular weight of 3,800 to 60,000, with the proviso that the glycidyl ether unit-containing polymer (E) is exclusive of the graft copolymer (B), and
a phosphorus-containing modified polyester-based resin (H) prepared by modifying a polyester-based resin (F) containing a phosphorus atom with a polycarbodiimide compound (G), wherein
the graft copolymer (B) is a polymer obtained by polymerizing a monomer mixture comprising an aromatic alkenyl compound monomer (a) and a vinyl cyanide compound monomer (b) in presence of a rubber-like polymer (B1),
within the resin main component (C), an amount of the polycarbonate resin (A) is from 80 to 100% by mass, an amount of the graft copolymer (B) is from 0 to 20% by mass, and a total of the polycarbonate resin (A) and the graft copolymer (B) is 100% by mass,
the polyester-based resin (F) comprises a dicarboxylic acid component containing a cyclic phosphorus compound represented by formula (1) shown below;

[Chemical formula 1]

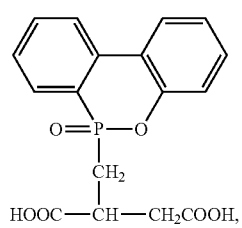

(1)

and a phosphorus atom content of the polyester-based resin (F) is at least 4% by mass but not more than 6% by mass, a proportion of the inorganic filler (D) is from 20 to 50% by mass of the reinforced thermoplastic resin composition, an amount of the glycidyl ether unit-containing polymer (E) is from 1 to 10 parts by mass per 100 parts by mass of the resin main component (C), and an amount of the phosphorus-containing modified polyester-based resin (H) is from 3 to 10 parts by mass per 100 parts by mass of the resin main component (C).

2. The reinforced thermoplastic resin composition according to claim 1, wherein the inorganic filler (D) is a carbon fiber.

3. The reinforced thermoplastic resin composition according to claim 1, wherein the inorganic filler (D) is a glass fiber.

4. The reinforced thermoplastic resin composition according to claim 1, further comprising a phosphate ester-based flame retardant (I).

5. A molded article obtained by molding the reinforced thermoplastic resin composition according to claim 1.

* * * * *